(12) United States Patent
Ren et al.

(10) Patent No.: US 12,021,592 B2
(45) Date of Patent: Jun. 25, 2024

(54) PRECODING MATRIX CONFIGURATION METHOD AND APPARATUS

(71) Applicant: HUAWEI TECHNOLOGIES CO., LTD., Guangdong (CN)

(72) Inventors: Xiang Ren, Shanghai (CN); Xiaoyan Bi, Shanghai (CN); Huangping Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 57 days.

(21) Appl. No.: 17/119,611

(22) Filed: Dec. 11, 2020

(65) Prior Publication Data

US 2021/0099214 A1 Apr. 1, 2021

Related U.S. Application Data

(63) Continuation of application No. PCT/CN2019/090207, filed on Jun. 5, 2019.

(30) Foreign Application Priority Data

Jun. 12, 2018 (CN) .......................... 201810604026.5

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0456* (2013.01); *H04L 5/0051* (2013.01);
(Continued)

(58) Field of Classification Search
CPC ... H04B 7/0639; H04B 7/0456; H04L 5/0051; H04L 25/0226; H04W 72/042; H04W 72/06

See application file for complete search history.

(56) References Cited

U.S. PATENT DOCUMENTS 11,418,240 B2 * 8/2022 Harrison ................ H01Q 21/24
2014/0056184 A1 2/2014 Yang et al.
(Continued)

FOREIGN PATENT DOCUMENTS

CN 105122753 A 12/2015
CN 107332600 A 11/2017
(Continued)

OTHER PUBLICATIONS

Huawei et al.,"Scheduling scheme for slot aggregation",3GPP TSG RAN WG1 Meeting #88bis R1-1705067,Spokane, USA, Apr. 3-7, 2017,total 7 pages.
(Continued)

*Primary Examiner* — Jackie Zuniga Abad
(74) *Attorney, Agent, or Firm* — WOMBLE BOND DICKINSON (US) LLP

(57) ABSTRACT

Embodiments of this application relate to the field of communications technologies, and disclose a precoding matrix configuration method and apparatus, to help improve performance of decoding data. The method may include: receiving first configuration information, where the first configuration information is used to configure M precoding matrices, M≥2, and M is an integer; and aggregately sending a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

19 Claims, 9 Drawing Sheets

(51) Int. Cl.
*H04L 5/00* (2006.01)
*H04L 25/02* (2006.01)
*H04W 72/23* (2023.01)
*H04W 72/563* (2023.01)

(52) U.S. Cl.
CPC ......... *H04L 25/0226* (2013.01); *H04W 72/23* (2023.01); *H04W 72/563* (2023.01)

(56) References Cited

U.S. PATENT DOCUMENTS

| | | | |
|---|---|---|---|
| 2016/0037493 A1* | 2/2016 | Kim | H04W 72/23 370/329 |
| 2017/0311296 A1* | 10/2017 | Onggosanusi | H04B 7/0456 |
| 2018/0013533 A1 | 1/2018 | Yang et al. | |
| 2018/0183503 A1* | 6/2018 | Rahman | H04W 72/042 |
| 2019/0149299 A1* | 5/2019 | Lee | H04L 5/0092 370/329 |
| 2020/0083939 A1* | 3/2020 | Park | H04L 5/10 |
| 2020/0287683 A1* | 9/2020 | Kwak | H04B 7/0626 |

FOREIGN PATENT DOCUMENTS

| | | |
|---|---|---|
| CN | 107733496 A | 2/2018 |
| CN | 107889251 A | 4/2018 |
| CN | 108092740 A | 5/2018 |
| CN | 108111283 A | 6/2018 |
| WO | 2017213561 A1 | 12/2017 |
| WO | 2018031869 A1 | 2/2018 |

OTHER PUBLICATIONS

CATT, Further discussion on transmission diversity scheme in UL. 3GPP TSG RAN WG1 Meeting #89, Hangzhou, P.R. China May 15-19, 2017, R1-1707472, 2 pages.

Intel Corporation, On Diversity Based UL Transmission. 3GPP TSG RAN WG1 NR Ad Hoc Meeting, Qingdao, China, Jun. 27-30, 2017, R1-1710520, 5 pages.

Nokia, Alcatel-Lucent Shanghai Bell, Summary of issues on UL non-codebook based transmissions. 3GPP TSG RAN WG1 NR Ad-Hoc #2, Qingdao, P.R. China Jun. 27-30, 2017, R1-1711884, 4 pages.

Huawei, HiSilicon, Reliability enhancement on PUCCHandPUSCH with multi-TRP/panel. 3GPP TSG RAN WGl meeting #96b, Xi''an, China, Apr. 8-12, 2019, R1-1905270, 2 pages.

* cited by examiner

PRECODING MATRIX CONFIGURATION METHOD AND APPARATUS

CROSS-REFERENCE TO RELATED APPLICATIONS

This application is a continuation of International Application No. PCT/CN2019/090207, filed on Jun. 5, 2019, which claims priority to Chinese Patent Application No. 201810604026.5, filed on Jun. 12, 2018, The disclosures of the aforementioned applications are hereby incorporated by reference in their entireties.

TECHNICAL FIELD

Embodiments of this application relate to the field of communications technologies, and in particular, to a precoding matrix configuration method and apparatus.

BACKGROUND

In a new radio (NR) system, to improve uplink coverage, to be specific, improve performance of a terminal at a cell edge or performance of the terminal during a poor channel condition, uplink transmission supports a slot aggregation transmission mode. A basic principle of the slot aggregation transmission mode is: The terminal repeatedly sends same data in a plurality of consecutive slots or mini-slots. In this way, a base station may combine or perform other processing on the same data received in the plurality of slots or mini-slots, to improve robustness of the uplink data transmission, and improve the uplink coverage, to be specific, improve the performance of the terminal at the cell edge or the performance of the terminal during the poor channel condition.

Currently, the slot aggregation transmission mode in the NR system supports only data transmission in which a quantity of transmission layers is 1 (that is, a rank rank is equal to 1), and when data is sent in a plurality of aggregated consecutive slots (or mini-slots), used configuration information such as a precoding matrix is configured based on downlink control information (DCI) received in the $1^{st}$ slot. In other words, a precoding matrix used for sending the data in each of the plurality of aggregated consecutive slots (or mini-slots) is the same. In this way, in the plurality of aggregated slots, if the channel condition changes, a position of the terminal moves, and so on, performance of decoding the received data by the base station may deteriorate. Consequently, uplink performance of the terminal cannot be ensured, and performance or uplink coverage of the terminal at the cell edge cannot be ensured.

SUMMARY

Embodiments of this application provide a precoding matrix configuration method and apparatus, to help improve performance of decoding data, improve uplink performance of a terminal, and improve performance or uplink coverage of a terminal at a cell edge.

According to a first aspect, an embodiment of this application provides a precoding matrix configuration method. The method is applied to uplink transmission, and the method may include: receiving first configuration information, where the first configuration information is used to configure M precoding matrices, M≥2, and M is an integer; and aggregately sending a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer. The time domain unit may be, for example, but is not limited to, one or more slots, or one or more mini-slots. The aggregately sending a signal in N time domain units is sending a same signal in the N time domain units. This technical solution creates a condition for implementing a difference between precoding matrices corresponding to at least two of the N aggregated time domain units. Different precoding matrices may represent different channel conditions, and a higher matching degree between a precoding matrix and an actual channel condition leads to higher performance of decoding data. Therefore, in a plurality of aggregated time domain units, if a channel condition changes or a position of a terminal moves, and so on, compared with a prior-art technical solution in which only one precoding matrix is used to precode data, this technical solution helps improve performance of decoding received data by a network device, so as to improve uplink performance of the terminal, and improve performance or uplink coverage of the terminal at a cell edge.

In an embodiment, the first configuration information is DCI. If the uplink transmission is non-codebook-based uplink transmission, the DCI includes first indication information, where the first indication information is used to indicate M sounding reference signal (SRS) resource indicators (SRI), and the M SRIs are used to configure the M precoding matrices. For example, the first indication information may be information carried in an SRI field included in the DCI. In other words, in this embodiment of this application, a technical solution in which in a non-codebook-based uplink transmission mode and in a time domain aggregation transmission mode, an SRI field indicates a plurality of SRIs is supported. This possible design provides a method for configuring the M precoding matrices.

In an embodiment, the first configuration information is DCI. If the uplink transmission is codebook-based uplink transmission, the DCI includes second indication information, where the second indication information is used to indicate M transmitted precoding matrix indicators (TPMI), and each TPMI is used to configure a precoding matrix with X columns. X is a quantity of transmission layers of the signal, X≥1, and X is an integer. For example, the second indication information may be information carried in a precoding information and quantity of layers field included in the DCI. In other words, in this embodiment of this application, a technical solution in which in a codebook-based uplink transmission mode and in a time domain aggregation transmission mode, a precoding information and quantity of layers field indicates a plurality of TPMIs is supported. This possible design provides a method for configuring the M precoding matrices.

In an embodiment, the first configuration information is DCI. If the uplink transmission is codebook-based uplink transmission, the DCI includes second indication information, where the second indication information is used to indicate one TPMI, the TPMI is used to configure one precoding matrix with M*X columns, and each of the M precoding matrices is one precoding matrix with X columns in the precoding matrix with M*X columns. X is a quantity of transmission layers of the signal, X≥1, and X is an integer. For example, the second indication information may be information carried in a precoding information and quantity of layers field included in the DCI. In other words, in this embodiment of this application, a technical solution in which a PUSCH precoding matrix is a matrix including some columns in a precoding matrix indicated by a TPMI is supported. This possible design provides a method for configuring the M precoding matrices.

In an embodiment, in a preset (or default) time domain aggregation transmission mode, the quantity X of transmission layers of the signal is equal to 1. For example, if uplink transmission is non-codebook-based uplink transmission, the quantity X of transmission layers of the signal is equal to 1 regardless of whether a quantity of SRIs indicated by the SRI field is 1. In other words, in this embodiment of this application, a technical solution in which a quantity of SRIs indicated by an SRI field is not equal to a PUSCH rank is supported. For example, if uplink transmission is codebook-based uplink transmission, optionally, that X=1 may be indicated by an index carried in the precoding information and quantity of layers field in the DCI.

In an embodiment, the quantity X of transmission layers of the signal has a value greater than 1. For example, X=2, 3, or 4.

In an embodiment, regardless of the non-codebook-based uplink transmission mode or the codebook-based uplink transmission mode, the DCI may further include third indication information, and the third indication information is used to indicate a number of a demodulation reference signal (DMRS) port used to send the signal. The number, of the DMRS port, indicated by the third indication information is X numbers, of DMRS ports, that are corresponding to the third indication information and that are determined in antenna port information that is based on X transmission layers. X is the quantity of transmission layers of the signal, $X \geq 1$, and X is an integer. Optionally, X=1. This possible design provides a method for indicating the number of the DMRS port.

In an embodiment, regardless of the non-codebook-based uplink transmission mode or the codebook-based uplink transmission mode, the DCI may further include third indication information, and the third indication information is used to indicate a number of a DMRS port used to send the signal. The number, of the DMRS port, indicated by the third indication information is: X numbers, of DMRS ports, at a first preset position in a DMRS port number set, where the DMRS port number set is a DMRS port number set that is corresponding to the third indication information and that is determined in antenna port information that is based on M*X transmission layers. X is the quantity of transmission layers of the signal, $X \geq 1$, and X is an integer. This possible design provides a method for indicating the number of the DMRS port.

In an embodiment, the M precoding matrices are obtained by repeating a precoding matrix group, the first configuration information is used to configure one or more offsets, a first precoding matrix in the precoding matrix group, and a quantity of repetitions of the precoding matrix group, and the offset is an offset of a number of a precoding matrix in the precoding matrix group relative to a number of another precoding matrix in the precoding matrix group. The quantity of repetitions may be 0, 1, or greater than 1. For example, the offset and the quantity of repetitions may be configured by using radio resource control (RRC) signaling or medium access control (MAC) control element (MAC CE) signaling, and the first precoding matrix may be configured by using DCI. In this example, the first configuration information may include RRC signaling or MAC signaling, and DCI signaling. This possible design provides a method for configuring the M precoding matrices.

In an embodiment, the method may further include: receiving second configuration information, where the second configuration information is used to configure a pattern of precoding matrices corresponding to the N time domain units, and the pattern is designed based on M; and determining, based on the pattern configured by using the second configuration information and the M precoding matrices, the precoding matrices corresponding to the N time domain units. The pattern of the precoding matrices corresponding to the N time domain units is a design rule of the precoding matrices corresponding to the N time domain units. Optionally, the second configuration information may be carried in RRC signaling or MAC CE signaling for sending. This possible design provides a method for determining the precoding matrices corresponding to the N time domain units based on the M precoding matrices.

In an embodiment, the method may further include: receiving third configuration information, where the third configuration information is used to configure a combined value L; and using N precoding matrices at a second preset position in a target sequence as precoding matrices corresponding to the N time domain units, where the target sequence is constructed based on a sequence obtained by repeating each of the M precoding matrices for L times in sequence. The combined value is used to indicate a quantity, of repetitions of each precoding matrix, configured by using the first configuration information. Optionally, the third configuration information may be carried in RRC signaling or MAC CE signaling for sending. This possible design provides a method for determining the precoding matrices corresponding to the N time domain units based on the M precoding matrices.

In an embodiment, if $M \geq N$, precoding matrices corresponding to the N time domain units are N precoding matrices at a third preset position in the M precoding matrices. Optionally, the rule may be agreed on by the network device and the terminal in advance. This possible design provides a method for determining the precoding matrices corresponding to the N time domain units based on the M precoding matrices.

In an embodiment, if M<N, precoding matrices corresponding to the N time domain units are N precoding matrices at a fourth preset position in a sequence obtained by repeating the M precoding matrices. Optionally, the rule may be agreed on by the network device and the terminal in advance. This possible design provides a method for determining the precoding matrices corresponding to the N time domain units based on the M precoding matrices.

In an embodiment, the first configuration information is used to indicate to determine precoding matrices corresponding to the N time domain units based on a sequence of the M precoding matrices. Optionally, M=N. This possible design provides a method for determining the precoding matrices corresponding to the N time domain units based on the M precoding matrices.

In an embodiment, the precoding matrix corresponding to each of the N time domain units is any one of the M precoding matrices. In other words, in this embodiment of this application, random setting of the precoding matrix corresponding to each of the N time domain units is supported. Optionally, the precoding matrices corresponding to at least two of the N time domain units are different. This possible design provides a method for determining the precoding matrices corresponding to the N time domain units based on the M precoding matrices.

According to a second aspect, an embodiment of this application provides a precoding matrix configuration method. The method is applied to uplink transmission, and the method may include: generating first configuration information, where the first configuration information is used to configure M precoding matrices, M≥2, and M is an integer; and sending the first configuration information, so that a terminal aggregately sends a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

In an embodiment, the method may further include: sending second configuration information, where the second configuration information is used to configure a pattern of precoding matrices corresponding to the N time domain units, and the pattern is designed based on M, so that the terminal determines, based on the pattern configured by using the second configuration information and the M precoding matrices, the precoding matrices corresponding to the N time domain units.

In an embodiment, the method may further include: sending third configuration information, where the third configuration information is used to configure a combined value L, so that the terminal uses N precoding matrices at a second preset position in a target sequence as precoding matrices corresponding to the N time domain units, where the target sequence is constructed based on a sequence obtained by repeating each of the M precoding matrices for L times in sequence.

According to the first aspect or the second aspect, the embodiments of this application further provide the following possible designs.

In an embodiment, the first configuration information is DCI. If the uplink transmission is non-codebook-based uplink transmission, the DCI includes first indication information, where the first indication information is used to indicate M sounding reference signal (SRS) resource indicators (SRI), and the M SRIs are used to configure the M precoding matrices. For example, the first indication information may be information carried in an SRI field included in the DCI. In other words, in the embodiments of this application, a technical solution in which in a non-codebook-based uplink transmission mode and in a time domain aggregation transmission mode, an SRI field indicates a plurality of SRIs is supported. This possible design provides a method for configuring the M precoding matrices.

In an embodiment, the first configuration information is DCI. If the uplink transmission is codebook-based uplink transmission, the DCI includes second indication information, where the second indication information is used to indicate M transmitted precoding matrix indicators (TPMI), and each TPMI is used to configure a precoding matrix with X columns. X is a quantity of transmission layers of the signal, X≥1, and X is an integer. For example, the second indication information may be information carried in a precoding information and quantity of layers field included in the DCI. In other words, in the embodiments of this application, a technical solution in which in a codebook-based uplink transmission mode and in a time domain aggregation transmission mode, a precoding information and quantity of layers field indicates a plurality of TPMIs is supported. This possible design provides a method for configuring the M precoding matrices.

In an embodiment, the first configuration information is DCI. If the uplink transmission is codebook-based uplink transmission, the DCI includes second indication information, where the second indication information is used to indicate one TPMI, the TPMI is used to configure one precoding matrix with M*X columns, and each of the M precoding matrices is one precoding matrix with X columns in the precoding matrix with M*X columns. X is a quantity of transmission layers of the signal, X≥1, and X is an integer. For example, the second indication information may be information carried in a precoding information and quantity of layers field included in the DCI. In other words, in the embodiments of this application, a technical solution in which a PUSCH precoding matrix is a matrix including some columns in a precoding matrix indicated by a TPMI is supported. This possible design provides a method for configuring the M precoding matrices.

In an embodiment, in a preset (or default) time domain aggregation transmission mode, the quantity X of transmission layers of the signal is equal to 1. For example, if uplink transmission is non-codebook-based uplink transmission, the quantity X of transmission layers of the signal is equal to 1 regardless of whether a quantity of SRIs indicated by the SRI field is 1. In other words, in the embodiments of this application, a technical solution in which a quantity of SRIs indicated by an SRI field is not equal to a PUSCH rank is supported. For example, if uplink transmission is codebook-based uplink transmission, optionally, that X=1 may be indicated by an index carried in the precoding information and quantity of layers field in the DCI.

In an embodiment, the quantity X of transmission layers of the signal is greater than 1. For example, X=2, 3, or 4.

In an embodiment, regardless of the non-codebook-based uplink transmission mode or the codebook-based uplink transmission mode, the DCI may further include third indication information, and the third indication information is used to indicate a number of a demodulation reference signal (DMRS) port used to send the signal. The number, of the DMRS port, indicated by the third indication information is X numbers, of DMRS ports, that are corresponding to the third indication information and that are determined in antenna port information that is based on X transmission layers. X is the quantity of transmission layers of the signal, X≥1, and X is an integer. Optionally, X=1. This possible design provides a method for indicating the number of the DMRS port.

In an embodiment, regardless of the non-codebook-based uplink transmission mode or the codebook-based uplink transmission mode, the DCI may further include third indication information, and the third indication information is used to indicate a number of a DMRS port used to send the signal. The number, of the DMRS port, indicated by the third indication information is: X numbers, of DMRS ports, at a first preset position in a DMRS port number set, where the DMRS port number set is a DMRS port number set that is corresponding to the third indication information and that is determined in antenna port information that is based on M*X transmission layers. X is the quantity of transmission layers of the signal, X≥1, and X is an integer. This possible design provides a method for indicating the number of the DMRS port.

In an embodiment, the M precoding matrices are obtained by repeating a precoding matrix group, the first configuration information is used to configure one or more offsets, a first precoding matrix in the precoding matrix group, and a quantity of repetitions of the precoding matrix group, and the offset is an offset of a number of a precoding matrix in the precoding matrix group relative to a number of another precoding matrix in the precoding matrix group. For example, the offset and the quantity of repetitions may be configured by using radio resource control (RRC) signaling or medium access control ( ) control element (MAC CE) signaling, and the first precoding matrix may be configured by using DCI. In this example, the first configuration information may include RRC signaling or MAC signaling, and DCI signaling. This possible design provides a method for configuring the M precoding matrices.

In an embodiment, if M≥N, precoding matrices corresponding to the N time domain units are N precoding matrices at a third preset position in the M precoding matrices. Optionally, the rule may be agreed on by the network device and the terminal in advance. This possible design provides a method for determining the precoding matrices corresponding to the N time domain units based on the M precoding matrices.

In an embodiment, if M<N, precoding matrices corresponding to the N time domain units are N precoding matrices at a fourth preset position in a sequence obtained by repeating the M precoding matrices. Optionally, the rule may be agreed on by the network device and the terminal in advance. This possible design provides a method for determining the precoding matrices corresponding to the N time domain units based on the M precoding matrices.

In an embodiment, the first configuration information is used to indicate to determine precoding matrices corresponding to the N time domain units based on a sequence of the M precoding matrices. Optionally, M=N. This possible design provides a method for determining the precoding matrices corresponding to the N time domain units based on the M precoding matrices.

In an embodiment, the precoding matrix corresponding to each of the N time domain units is any one of the M precoding matrices. In other words, in the embodiments of this application, random setting of the precoding matrix corresponding to each of the N time domain units is supported. Optionally, precoding matrices corresponding to at least two of the N time domain units are different. This possible design provides a method for determining the precoding matrices corresponding to the N time domain units based on the M precoding matrices.

According to a third aspect, an embodiment of this application provides a precoding matrix configuration apparatus. The apparatus may be configured to perform any method provided in the first aspect. The apparatus may be a terminal.

In an embodiment, function modules of the apparatus may be obtained through division according to the method provided in the first aspect. For example, the function modules may be obtained through division corresponding to functions, or two or more functions may be integrated into one processing module.

In another possible design, the apparatus may include: a memory and a processor, where the memory is configured to store a computer program, and when the computer program is executed by the processor, any method provided in the first aspect is performed.

According to a fourth aspect, an embodiment of this application provides a precoding matrix configuration apparatus. The apparatus may be configured to perform any method provided in the second aspect. The apparatus may be a network device such as a base station.

In an embodiment, function modules of the apparatus may be obtained through division according to the method provided in the second aspect. For example, the function modules may be obtained through division corresponding to functions, or two or more functions may be integrated into one processing module.

In another possible design, the apparatus may include: a memory and a processor, where the memory is configured to store a computer program, and when the computer program is executed by the processor, any method provided in the second aspect is performed.

It should be noted that the memory and the processor described in the embodiments of this application may be integrated into one chip, or may be separately disposed on different chips. A type of the memory and a manner of disposing the memory and the processor are not limited in the embodiments of this application.

According to a fifth aspect, an embodiment of this application provides a processor. The processor may include:

at least one circuit, configured to receive first configuration information through a receiver, where the first configuration information is used to configure M precoding matrices, M≥2, and M is an integer; and at least one circuit, configured to aggregately send a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

In an embodiment, the processor may further include:

at least one circuit, configured to receive second configuration information through the receiver, where the second configuration information is used to configure a pattern of precoding matrices corresponding to the N time domain units, and the pattern is designed based on M; and at least one circuit, configured to determine, based on the pattern configured by using the second configuration information and the M precoding matrices, the precoding matrices corresponding to the N time domain units.

In an embodiment, the processor may further include:

at least one circuit, configured to receive third configuration information through the receiver, where the third configuration information is used to configure a combined value L; and at least one circuit, configured to use N precoding matrices at a second preset position in a target sequence as precoding matrices corresponding to the N time domain units, where the target sequence is constructed based on a sequence obtained by repeating each of the M precoding matrices for L times in sequence.

For explanations and specific implementations of related content provided in the fifth aspect, refer to related descriptions in the first aspect.

According to a sixth aspect, an embodiment of this application provides a processor. The processor may include:

at least one circuit, configured to generate first configuration information, where the first configuration information is used to configure M precoding matrices, M≥2, and M is an integer; and at least one circuit, configured to send the first configuration information through a transmitter, so that a terminal aggregately sends a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

In an embodiment, the processor may further include:

at least one circuit, configured to send second configuration information through the transmitter, where the second configuration information is used to configure a pattern of precoding matrices corresponding to the N time domain units, and the pattern is designed based on M, so that the terminal determines, based on the pattern configured by using the second configuration information and the M precoding matrices, the precoding matrices corresponding to the N time domain units.

In an embodiment, the processor may further include:

at least one circuit, configured to send third configuration information through the transmitter, where the third configuration information is used to configure a combined value L, so that the terminal uses N precoding matrices at a second preset position in a target sequence as precoding matrices corresponding to the N time domain units, where the target sequence is constructed based on a sequence obtained by repeating each of the M precoding matrices for L times in sequence.

For explanations and specific implementations of related content provided in the sixth aspect, refer to related descriptions in the second aspect.

According to a seventh aspect, an embodiment of this application provides a processing device. The processing device includes a receiver and a processor. The receiver is configured to receive first configuration information, where the first configuration information is used to configure M precoding matrices, M≥2, and M is an integer. The processor is configured to aggregately send a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

In an embodiment, the receiver is further configured to receive second configuration information, where the second configuration information is used to configure a pattern of precoding matrices corresponding to the N time domain units, and the pattern is designed based on M; and the processor is further configured to determine, based on the pattern configured by using the second configuration information and the M precoding matrices, the precoding matrices corresponding to the N time domain units.

In an embodiment, the receiver is further configured to receive third configuration information, where the third configuration information is used to configure a combined value L; and the processor is further configured to use N precoding matrices at a second preset position in a target sequence as precoding matrices corresponding to the N time domain units, where the target sequence is constructed based on a sequence obtained by repeating each of the M precoding matrices for L times in sequence.

For explanations and specific implementations of related content provided in the seventh aspect, refer to related descriptions in the first aspect.

According to an eighth aspect, an embodiment of this application provides a processing device. The processing device includes a processor and a transmitter. The processor is configured to generate first configuration information, where the first configuration information is used to configure M precoding matrices, M≥2, and M is an integer. The transmitter is configured to send the first configuration information, so that a terminal aggregately sends a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

In an embodiment, the transmitter is further configured to send second configuration information, where the second configuration information is used to configure a pattern of precoding matrices corresponding to the N time domain units, and the pattern is designed based on M, so that the terminal determines, based on the pattern configured by using the second configuration information and the M precoding matrices, the precoding matrices corresponding to the N time domain units.

In an embodiment, the transmitter is further configured to send third configuration information, where the third configuration information is used to configure a combined value L, so that the terminal uses N precoding matrices at a second preset position in a target sequence as precoding matrices corresponding to the N time domain units, where the target sequence is constructed based on a sequence obtained by repeating each of the M precoding matrices for L times in sequence.

For explanations and specific implementations of related content provided in the eighth aspect, refer to related descriptions in the second aspect.

In a specific implementation process, the processor may be configured to perform, for example, but not limited to, baseband-related processing, and the receiver and the transmitter may be separately configured to perform, for example, but not limited to, radio frequency receiving and sending. The foregoing components may be separately disposed on chips that are independent of each other, or at least some or all of the foregoing components may be disposed on a same chip. For example, the receiver and the transmitter may be disposed on a receiver chip and a transmitter chip that are independent of each other, or may be integrated as a transceiver and then disposed on a transceiver chip. For another example, the processor may be further classified into an analog baseband processor and a digital baseband processor, where the analog baseband processor and the transceiver may be integrated into a same chip, and the digital baseband processor may be disposed on an independent chip. With continuous development of integrated circuit technologies, more and more components can be integrated on a same chip. For example, the digital baseband processor and a plurality of application processors (for example, but not limited to, a graphics processor and a multimedia processor) may be integrated on a same chip. Such a chip may be referred to as a system on chip (system on chip). Whether the components are independently disposed on different chips or are integrated and disposed on one or more chips usually depends on specific requirements of a product design. A specific implementation form of the foregoing components is not limited in the embodiments of this application.

An embodiment of this application further provides a computer-readable storage medium. The computer-readable storage medium stores a computer program, and when the computer program is run on a computer, the computer is enabled to perform any possible method according to the first aspect and the second aspect.

An embodiment of this application further provides a computer program product. When the computer program product runs on a computer, any method provided in the first aspect and the second aspect is performed.

This application further provides a communications chip. The communications chip stores an instruction, and when the instruction is run on a network device or a terminal, the network device or the terminal is enabled to perform any method provided in the first aspect and the second aspect.

It may be understood that any precoding matrix configuration apparatus, processor, processing device, computer-readable storage medium, computer program product, or the like provided above is configured to perform the corresponding method provided above. Therefore, for beneficial effects that can be achieved by the precoding matrix configuration apparatus, processor, processing device, computer-readable storage medium, computer program product, or the like, refer to beneficial effects in the corresponding method. Details are not described herein again.

It should be noted that, the foregoing components that are provided in the embodiments of this application and that are configured to store the computer instruction or the computer program, for example, but not limited to, the foregoing memory, computer-readable storage medium, and communications chip, are all non-transitory.

DETAILED DESCRIPTION OF EMBODIMENTS

Technical solutions provided in embodiments of this application may be applied to various communications systems, for example, a 5G communications system such as a 5G NR system, a future evolved system, a plurality of converged communications systems, or an existing communications system. Application scenarios of the technical solutions provided in the embodiments of this application may include a plurality of scenarios, for example, machine to machine (M2M), macro-micro communication, enhanced mobile broadband (eMBB), ultra-reliable and low-latency communication (uRLLC), and massive machine type communication (mMTC). These scenarios may include but are not limited to: a scenario of communication between terminals, a scenario of communication between network devices, a scenario of communication between a network device and a terminal, and the like. The following uses an example in which the technical solutions are applied to the scenario of communication between a network device and a terminal for description.

Figure 1:
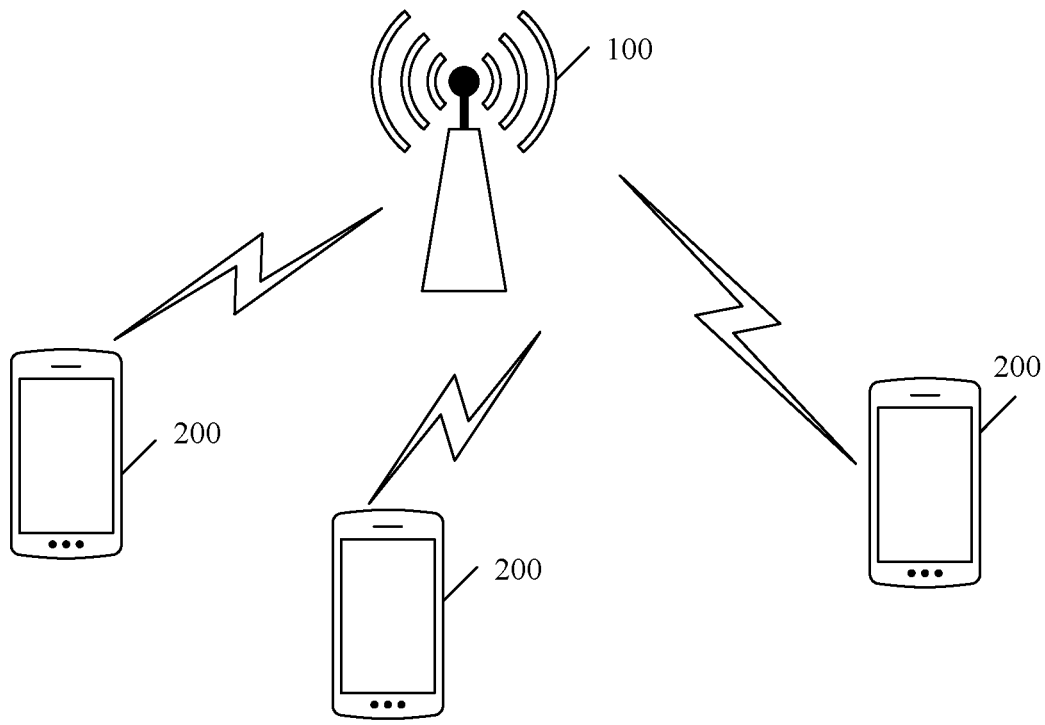
FIG. 1 is a schematic architectural diagram of a communications system applicable to a technical solution according to an embodiment of this application.

FIG. 1 is a schematic diagram of a communications system to which technical solutions provided in this application are applicable. The communications system may include one or more network devices 100 (only one network device is shown) and one or more terminals 200 connected to each network device 100. FIG. 1 is merely a schematic diagram, and does not constitute a limitation on a scenario to which the technical solutions provided in this application are applicable.

The network device 100 may be a transmission reception point (TRP), a base station, a relay station, an access point, or the like. The network device 100 may be a network device in a 5G communications system or a network device in a future evolved network; or may be a wearable device, a vehicle-mounted device, or the like. In addition, the network device 100 may be a base transceiver station (BTS) in a global system for mobile communications (GSM) or code division multiple access (CDMA) network, or may be an NB (NodeB) in wideband code division multiple access (wideband code division multiple access, WCDMA), or may be an eNB or an eNodeB (evolutional NodeB) in long term evolution (LTE). Alternatively, the network device 100 may be a radio controller in a cloud radio access network (CRAN) scenario.

The terminal 200 may be user equipment (UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a 5G network, a terminal in a future evolved public land mobile network (PLMN) network, or the like.

Optionally, the network elements (for example, the network device 100 and the terminal 200) in FIG. 1 may be implemented by one device, or may be jointly implemented by a plurality of devices, or may be a function module in a device. This is not limited in the embodiments of this application. It may be understood that the foregoing functions may be network elements in a hardware device, or may be software functions running on dedicated hardware, or may be virtualization functions instantiated on a platform (for example, a cloud platform).

Figure 2:
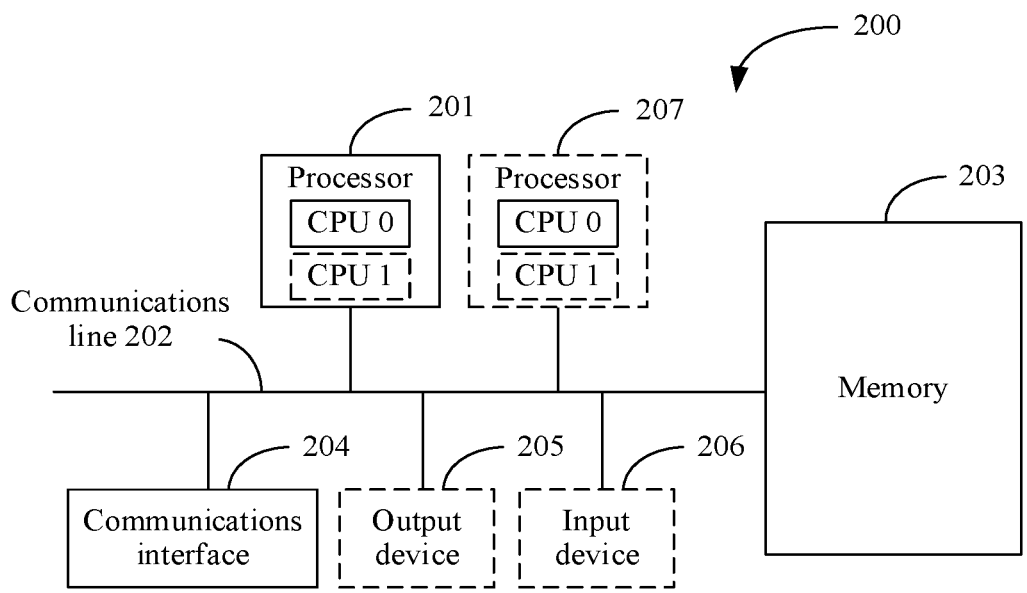
FIG. 2 is a schematic structural diagram of a communications device according to an embodiment of this application.

For example, each network element in FIG. 1 may be implemented by using a communications device 200 in FIG. 2. FIG. 2 is a schematic structural diagram of hardware of a communications device according to an embodiment of this application. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in a solution of this application.

The communications line 202 may include a path for transmitting information between the foregoing components.

The memory 203 may be a read-only memory (ROM) or another type of static storage device that can store static information and instructions, or random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor through the communications line 202. The memory may alternatively be integrated with the processor. The memory provided in the embodiments of this application may usually be non-volatile. The memory 203 is configured to store a computer-executable instruction for executing the solutions of this application, and the processor 201 controls the execution. The processor 201 is configured to execute the computer-executable instruction stored in the memory 203, to implement the method provided in the following embodiments of this application.

The communications interface 204 is any apparatus such as a transceiver, and is configured to communicate with another device or communications network. The communications network may be, for example, but is not limited to, any one of the following: the Ethernet, a radio access network (RAN), or a wireless local area network (WLAN).

Optionally, the computer-executable instruction in the embodiments of this application may also be referred to as application program code. This is not limited in the embodiments of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive an input from a user in a plurality of manners. For example, the input device 206 may be a mouse, a keyboard, a touchscreen device, a sensing device, or the like.

The foregoing communications device 200 may be a general-purpose device or a dedicated device. During specific implementation, the communications device 200 may be a desktop computer, a portable computer, a network server, a palmtop computer (PDA), a mobile phone, a tablet computer, a wireless terminal device, an embedded device, or a device with a structure similar to that in FIG. 2. A type of the communications device 200 is not limited in the embodiments of this application.

The following explains and describes related terms and technologies in this application.

(1) Non-Codebook (NCB)-Based Uplink Transmission Mode

For example, when a terminal is configured to be in a non-codebook-based uplink transmission mode, a network device sends a channel state information reference signal (CSI-RS) to the terminal. After receiving the CSI-RS, the terminal obtains downlink channel quality information through measurement, obtains uplink channel quality information through calculation based on channel reciprocity, then designs a plurality of precoding matrices based on the uplink channel quality information, precodes a plurality of SRSs based on the plurality of precoding matrices, and then sends a plurality of SRSs obtained after precoding. Optionally, one precoding matrix corresponds to one SRS. After receiving the plurality of SRSs obtained after precoding, the network device sends, to the terminal by using DCI, one or more SRIs (SRS resource indicators) and a physical uplink shared channel (, PUSCH) rank that are recommended by the network device. One SRS resource is usually configured with one SRS port. The PUSCH rank may be understood as an actual rank used by the terminal to transmit data on a PUSCH. Subsequently, the terminal may perform PUSCH transmission by using a precoding matrix corresponding to the PUSCH rank and the SRI that are recommended by the network device.

Figure 3:
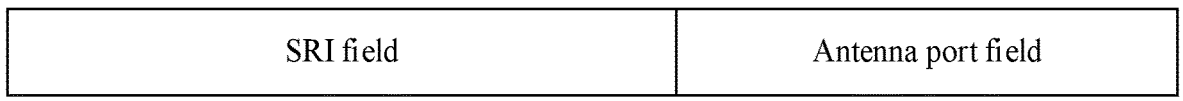
FIG. 3 is a schematic structural diagram of DCI that is in a non-codebook-based uplink transmission mode and that is applicable to an embodiment of this application.

FIG. 3 is a schematic structural diagram of DCI that is in a non-codebook-based uplink transmission mode and that is applicable to an embodiment of this application. The DCI shown in FIG. 3 may include an SRI field and an antenna port field. The SRI field is used to carry an index, and the index is used to indicate one SRS resource selected by a network device from a plurality of SRS resources configured for a terminal. A quantity of SRS resources configured for the terminal may be configured by using RRC signaling. For descriptions of the antenna port field, refer to the following descriptions.

For example, after receiving the DCI, the terminal first determines a table based on a maximum quantity of uplink transmission layers (that is, a maximum quantity of supported transmission layers for a PUSCH (Maximum number of supported layers for PUSCH), which may be marked as L_max). For example, in a 5G standard, if L_max=3, the determined table may be "Table 7.3.1.1.2-30 SRI indication for non-codebook-based PUSCH transmission (SRI indication for non-codebook-based PUSCH transmission, L_max=3)", as shown in Table 1. The maximum quantity of uplink transmission layers L_max may be configured by using RRC signaling. Then, the terminal determines, based on the quantity (N_SRS) of the configured SRS resources and the index carried in the SRI field, a table cell in the table, where a number in the table cell represents an SRI recommended by the network device, and a quantity of SRIs in the table cell represents a PUSCH rank. For example, referring to Table 1, when four SRS resources are configured for the terminal, that is, N_SRS=4, and the index carried in the SRI field is 8, the determined table cell includes 1 and 3. It can be learned that the SRI recommended by the network device is equal to 1 and 3, and the PUSCH rank is equal to 2.

TABLE 1

| Index | SRI(s), N_SRS = 2 | Index | SRI(s), N_SRS = 4 | Index | SRI(s), N_SRS = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | Reserved (reserved) | 3 | 0, 1 | 3 | 3 |
|  |  | 4 | 0, 2 | 4 | 0, 1 |
|  |  | 5 | 1, 2 | 5 | 0, 2 |
|  |  | 6 | 0, 1, 2 | 6 | 0, 3 |
|  |  | 7 | Reserved | 7 | 1, 2 |
|  |  |  |  | 8 | 1, 3 |
|  |  |  |  | 9 | 2, 3 |
|  |  |  |  | 10 | 0, 1, 2 |
|  |  |  |  | 11 | 0, 1, 3 |
|  |  |  |  | 12 | 0, 2, 3 |
|  |  |  |  | 13 | 1, 2, 3 |
|  |  |  |  | 14-15 | Reserved |

The index in Table 1 is an index to which a bit field is mapped (Bit field mapped to index), and the bit field is the SRI field.

It should be noted that the foregoing related descriptions of the non-codebook-based uplink transmission mode are all examples, and do not constitute a limitation on the non-codebook-based uplink transmission mode described in this application.

(2) Codebook (CB)-Based Uplink Transmission Mode

For example, when a terminal is configured to be in a codebook-based uplink transmission mode, the terminal sends an SRS to a network device. The network device measures a channel condition based on the received SRS, selects a proper PUSCH precoding matrix and a proper PUSCH rank, and then delivers the selected PUSCH precoding matrix and the selected PUSCH rank to the terminal by using DCI. The PUSCH precoding matrix is a precoding matrix used for sending data on a PUSCH. Subsequently, the terminal may perform PUSCH transmission by using the PUSCH precoding matrix and the PUSCH rank that are recommended by the network device.

Figure 4:
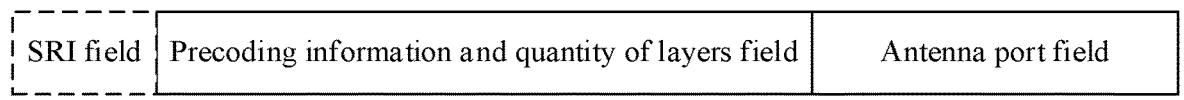
FIG. 4 is a schematic structural diagram of DCI that is in a codebook-based uplink transmission mode and that is applicable to an embodiment of this application.

FIG. 4 is a schematic structural diagram of DCI that is in a codebook-based uplink transmission mode and that is applicable to an embodiment of this application. As shown in FIG. 4, the DCI may include a precoding information and quantity of layers (precoding information and number of layers) field, and an antenna port field. Optionally, the DCI may further include an SRI field.

The SRI field is used to carry an index, and the index is used to indicate one SRS resource selected by a network device from a plurality of SRS resources configured for a terminal. For example, in the codebook-based uplink transmission mode, a maximum of two SRS resources may be configured for the terminal, and a minimum of one SRS resource may be configured for the terminal. If one SRS resource is configured for the terminal, the DCI may not include the SRI field. A quantity of SRS resources configured for the terminal may be configured by using RRC signaling. For example, a maximum of four SRS ports may be configured for each SRS resource, and a quantity of SRS ports configured for each SRS resource may be configured by using RRC signaling.

The precoding information and quantity of layers field is used to carry an index, and the index is used to indicate a transmission rank indicator (TRI) and a TPMI. The TRI is used to configure a PUSCH rank. The TPMI is used to configure a PUSCH precoding matrix.

For related descriptions of the antenna port field, refer to the following descriptions.

For example, after receiving the DCI, the terminal first determines a table based on a maximum uplink transmission rank (for example, marked as maxRank, and maxRank=L_max) and a quantity of SRS ports configured for the SRS resource indicated by the SRI field. For example, in a 5G standard, it is assumed that maxRank=2, and the quantity of SRS ports configured for the SRS resource indicated by the SRI field is 2. In this case, the determined table may be "Table 7.3.1.1.2-4 Precoding information and quantity of layers, for 2 antenna ports, if transformPrecoder=disabled and maxRank=2 (Precoding information and number of layers, for 2 antenna ports, if transformPrecoder=disabled and maxRank=2)". A part of Table 7.3.1.1.2-4 is shown in Table 2. Then, the terminal may determine a table cell in the table based on the index carried in the precoding information and quantity of layers field. A quantity, of layers, included in the table cell indicates a value of the TRI, namely, a value of the PUSCH rank. For example, it is assumed that an index carried in the precoding information and quantity of layers field is 4. In this case, the table cell determined by the terminal includes "1 layer: TPMI=3". In other words, the TRI recommended by the network device is equal to 1, that is, the PUSCH rank=1, and the TPMI=3.

TABLE 2

| Index | Codebook subset = fully, partial, and noncoherent (codebookSubset = fullyAndPartialAndNonCoherent) |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9-15 | reserved |

The index in Table 2 is an index to which a bit field is mapped, and the bit field is the SRI field.

Then, the terminal may determine a codebook based on the TRI and the quantity of SRS ports configured for the SRS resource indicated by the SRI field, and the TPMI is used to indicate a precoding matrix in the codebook. The codebook is pre-stored in the network device and the terminal, a quantity of rows of each precoding matrix in the codebook is a quantity of SRS ports configured for the SRS resource indicated by the SRI field, and a quantity of columns is a rank indicated by the TRI. For example, in the 5G standard, based on the foregoing example, a quantity of SRS ports is 2, and the TRI is 1 layer. In this case, the determined codebook is "Table 6.3.1.5-1 Precoding matrix W for single-layer transmission using two antenna ports (Precoding matrix W for single-layer transmission using two antenna ports)", as shown in Table 3.

TABLE 3

| TPMI index | W ordered from left to right in an increasing order of TPMI indexes (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

For example, it is assumed that information that is indicated by the precoding information and quantity of layers field and that is determined by the terminal is "1 layer: TPMI=3". In this case, referring to Table 3, it may be learned that a precoding matrix recommended by the network device is $$\frac{1}{\sqrt{2}}\begin{bmatrix}1\\-1\end{bmatrix}.$$

It should be noted that the foregoing related descriptions of the codebook-based uplink transmission mode are all examples, and do not constitute a limitation on the codebook-based uplink transmission mode described in this application.

(3) DMRS Port

To ensure that a network device can correctly decode data obtained after precoding after receiving the data obtained after precoding, a terminal needs to send a DMRS to measure channel quality of a PUSCH. Because data transmitted on the PUSCH and the DMRS are precoded by using a same precoding matrix, the network device may obtain, based on the DMRS, an equivalent channel obtained after precoding, in this way, the data is decoded. Before transmitting the data on the PUSCH, the terminal needs to determine a specific DMRS port to be used to send the data. A DMRS port in an NR system is indicated in an antenna port field in DCI, and the DMRS port is selected based on a PUSCH rank. Optionally, a quantity of DMRS ports that can be scheduled by the terminal is equal to the PUSCH rank. In this way, bit overheads of the DCI can be reduced.

For example, the terminal first determines the PUSCH rank based on a non-codebook-based uplink transmission mode or a codebook-based uplink transmission mode, then determines a table based on the PUSCH rank and related configuration information of the DMRS, and then the terminal determines, based on an index carried in the antenna port field, a DMRS port corresponding to the index.

For example, in a 5G standard, it is assumed that the PUSCH rank=1. In this case, the table determined by the terminal may be "Table 7.3.1.1.2-12 Antenna port(s), cyclic prefix (cyclic prefix, CP)-orthogonal frequency division multiplexing (orthogonal frequency division multiplexing, OFDM), dmrs-Type=1, maxLength=2, rank=1 (Antenna port(s), transformPrecoder=disabled, dmrs-Type=1, maxLength=2, rank=1)". A part of Table 7.3.1.1.2-12 is shown in Table 4. Referring to Table 4, if an index carried in the antenna port field is an index 5, the DMRS port is a DMRS port 3.

TABLE 4

| Index | DMRS port |
|---|---|
| 0 | 0 |
| 1 | 1 |

TABLE 4-continued

| Index | DMRS port |
|---|---|
| 2 | 0 |
| 3 | 1 |
| 4 | 2 |
| 5 | 3 |
| 6 | 0 |
| 7 | 1 |
| 8 | 2 |
| 9 | 3 |
| 10 | 4 |
| 11 | 5 |
| 12 | 6 |
| 13 | 7 |
| 14-15 | Reserved |

For another example, in the 5G standard, if the PUSCH rank=2, the table determined by the terminal may be "Table 7.3.1.1.2-13 Antenna port(s), transformPrecoder=disabled, dmrs-Type=1, maxLength=2, rank=2". A part of Table 7.3.1.1.2-13 is shown in Table 5. Referring to Table 5, if an index carried in the antenna port field is an index 5, the DMRS ports are DMRS ports 2 and 3.

TABLE 5

| Index | DMRS port |
|---|---|
| 0 | 0, 1 |
| 1 | 0, 1 |
| 2 | 2, 3 |
| 3 | 0, 2 |
| 4 | 0, 1 |
| 5 | 2, 3 |
| 6 | 4, 5 |
| 7 | 6, 7 |
| 8 | 0, 4 |
| 9 | 2, 6 |
| 10-15 | Reserved |

It should be noted that the foregoing related descriptions of the DMRS port are all examples, and do not constitute a limitation on the DMRS port described in this application.

(4) Time Domain Aggregation Transmission Mode

Similar to a slot aggregation transmission mode, a concept of a time domain aggregation transmission mode is introduced in the embodiments of this application. A basic principle of the time domain aggregation transmission mode is: A terminal repeatedly sends same data in N time domain units. N≥2, and N is an integer.

A time domain unit is a minimum unit in a time domain aggregation transmission mode (for example, the slot aggregation transmission mode). In the slot aggregation transmission mode, the time domain unit may be a slot or a mini-slot. In this application, the time domain unit may be, for example, but is not limited to, one or more slots, one or more mini-slots, or one or more symbols. The symbol may include, but is not limited to, any one of the following: an OFDM symbol, a universal filtered multi-carrier (UFMC) signal, a filter-bank multi-carrier (FBMC) symbol, a generalized frequency division multiplexing (generalized frequency-division multiplexing, GFDM) symbol, or the like.

Optionally, N may be a power of 2, for example, N=2, 4, or 8. Certainly, this application is not limited thereto. A value of N and specific time domain units that are the N time domain units may be configured by a network device for the terminal, for example, may be configured by using at least one of RRC signaling, medium access control (MAC) control element (CE) signaling, or DCI; or may be configured based on a technical solution provided in the slot aggregation transmission mode.

Figure 5A:
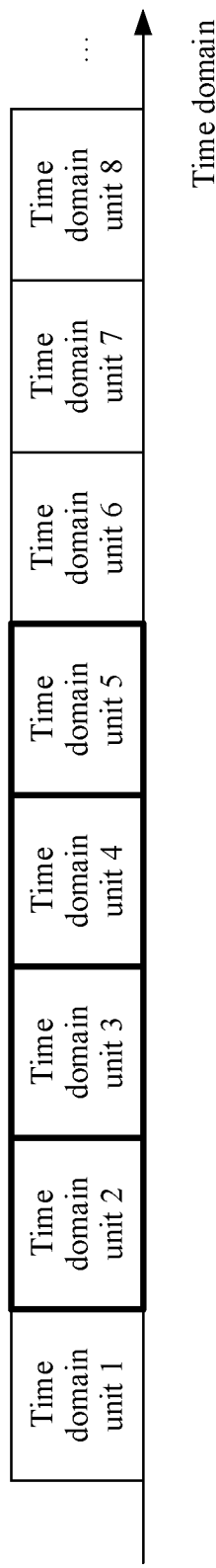
FIG. 5A is a first schematic diagram of an aggregated time domain unit according to an embodiment of this application.

Optionally, the N time domain units may be N consecutive time domain units in time domain. FIG. 5A is a schematic diagram of an aggregated time domain unit according to an embodiment of this application. In FIG. 5A, N time domain units in one time of aggregation transmission are time domain units 2 to 5.

Figure 5B:
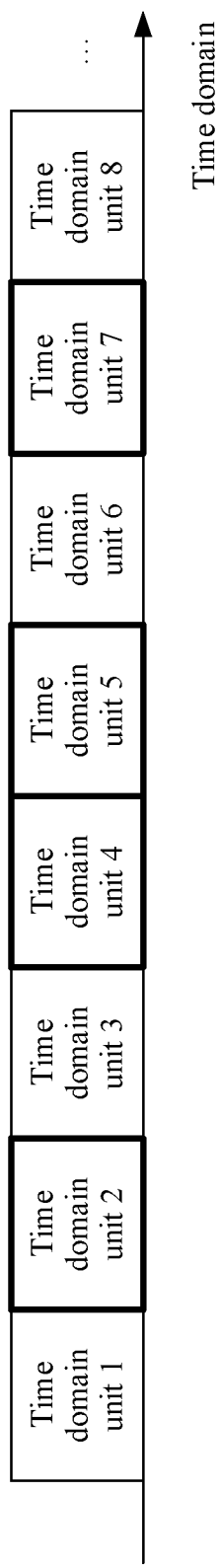
FIG. 5B is a second schematic diagram of an aggregated time domain unit according to an embodiment of this application.

Optionally, the N time domain units may be N nonconsecutive time domain units in time domain. FIG. 5B is a schematic diagram of another aggregated time domain unit according to an embodiment of this application. In FIG. 5B, N time domain units in one time of aggregation transmission are time domain units 2, 4, 5, and 7.

Figure 6:
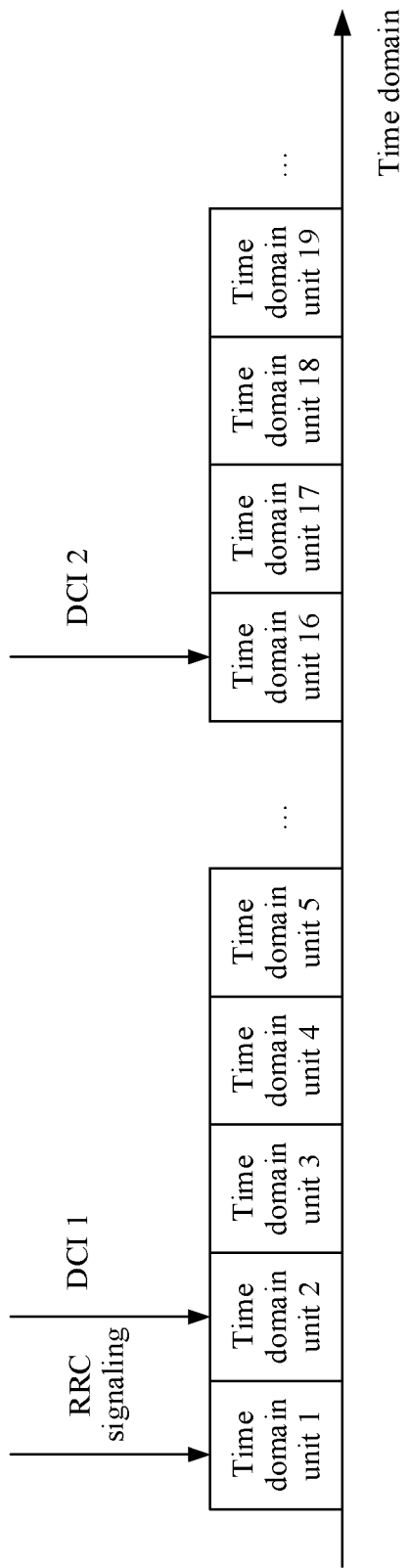
FIG. 6 is a schematic diagram of a time domain aggregation transmission mode applicable to an embodiment of this application.

During specific implementation, the network device may configure, by using, for example, but not limited to, RRC signaling, that the terminal needs to perform uplink transmission based on a time domain aggregation transmission mode, and indicate a quantity of aggregated time domain units, that is, a value of N. Optionally, the network device may further indicate, by using the RRC signaling, time domain units on which aggregation transmission is to be performed. Optionally, a time domain unit from which the aggregation transmission starts may be further indicated by using DCI. For example, as shown in FIG. 6, it is assumed that the N time domain units in aggregation transmission are consecutive in time domain. In this case, the network device may send RRC signaling to the terminal in a time domain unit 1, to configure that the terminal needs to perform uplink transmission based on a time domain aggregation transmission mode and N=4; configure, by using DCI 1, that the terminal starts one time of aggregation transmission from a time domain unit 2; and configure, by using DCI 2, that the terminal starts one time of aggregation transmission from a time domain unit 16.

In addition, the term "a plurality of" in this application means two or more. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. When the character "/" is used in a formula, the character generally indicates a "division" relationship between the associated objects. For example, a formula AB indicates that A is divided by B. In this application, the terms "first", "second", and the like are intended to distinguish between different objects but do not indicate a particular order of the objects.

The following describes the technical solutions provided in the embodiments of this application with reference to the accompanying drawings.

Figure 7:
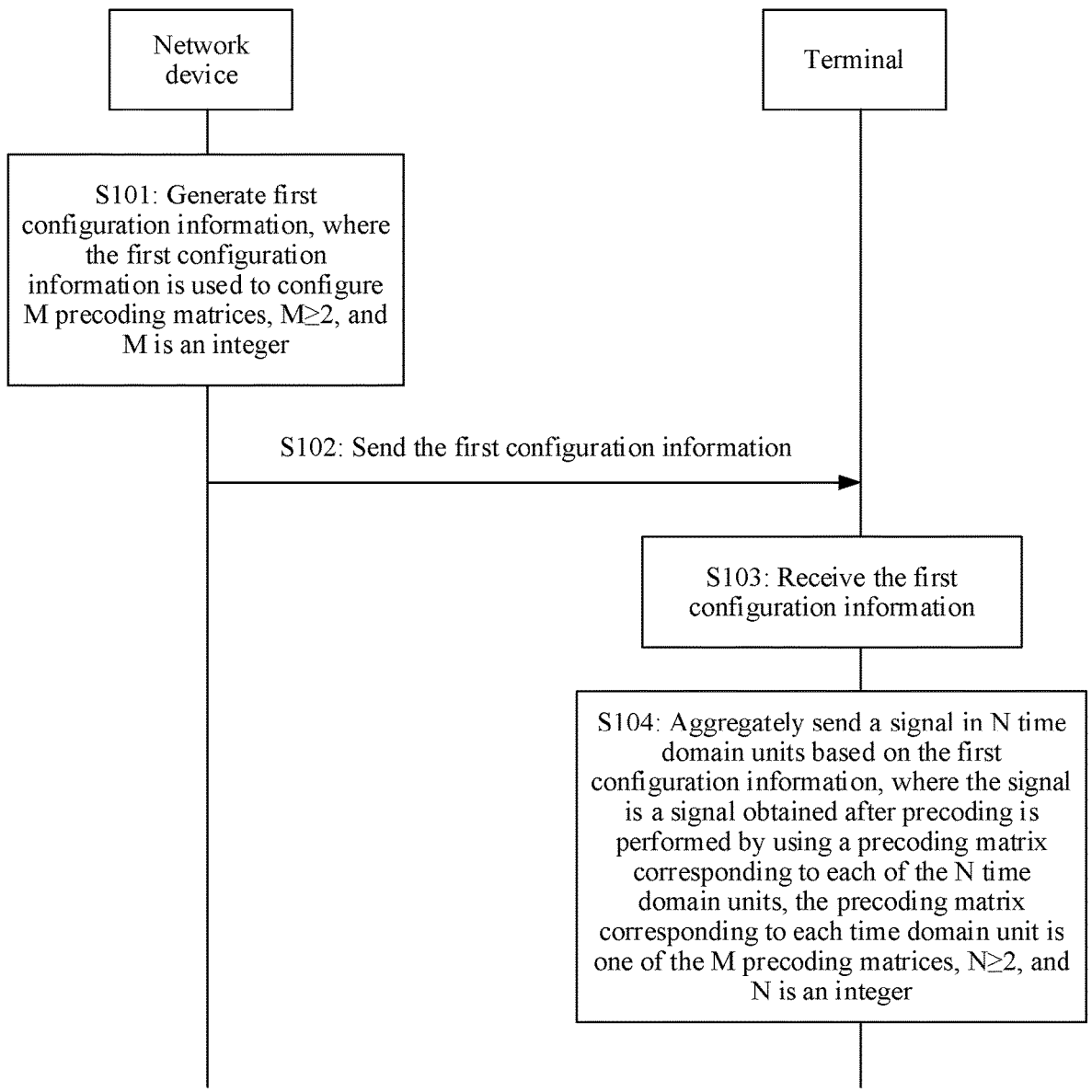
FIG. 7 is a first schematic flowchart of a precoding matrix configuration method according to an embodiment of this application.

FIG. 7 is a schematic interaction diagram of a precoding matrix configuration method according to an embodiment of this application. The method shown in FIG. 7 may include the following operations.

S101: A network device generates first configuration information. The first configuration information is used to configure M precoding matrices, M≥2, and M is an integer.

This embodiment of this application is applied to an uplink transmission scenario, and the uplink transmission scenario supports a time domain aggregation transmission mode. This embodiment of this application may be applied to a codebook-based uplink transmission mode, or may be applied to a non-codebook-based uplink transmission mode.

A specific type of the first configuration information is not limited in this embodiment of this application. In a specific implementation process, the M precoding matrices are configured in many manners. The manner is, for example, but is not limited to, a manner in which the M precoding matrices may be directly configured, for example, the M precoding matrices or indexes of the M precoding matrices are configured. Alternatively, the M precoding matrices may be indirectly configured by configuring other information. There is an association relationship between the other information and the M precoding matrices. For example, the M precoding matrices are configured in the following manner 2. Alternatively, only a part of the M precoding matrices may be configured, and the other part of the M precoding matrices are known or agreed on in advance. Alternatively, an arrangement sequence, of pieces of information, that is agreed on in advance (for example, stipulated in a protocol) may be used to implement configuration of specific information, so as to reduce configuration overheads to some extent. For example, the M precoding matrices follow a sequence. In addition, the network device may further identify a common part of each piece of information and perform unified configuration, to reduce configuration overheads caused by separately configuring same information.

For example, this embodiment is applied to the codebook-based uplink transmission mode, and optionally, at least two of the M precoding matrices configured by the network device are different. In this optional implementation, there may be same precoding matrices in the M precoding matrices. For example, assuming that M=4, the M precoding matrices may be precoding matrices 1, 2, 1, and 2. In addition, the M precoding matrices may be different. For example, assuming that M=4, the M precoding matrices may be precoding matrices 1, 2, 3, and 4. Optionally, the M precoding matrices configured by the network device may follow a sequence, or may not follow a sequence. For example, it is assumed that M=4, and the M precoding matrices are precoding matrices 1, 2, 1, and 2. In this case, if the M precoding matrices follow a sequence, it indicates that the M precoding matrices configured by using the first configuration information include two precoding matrices 1 and two precoding matrices 2, and a sequence of the four precoding matrices is the precoding matrices 1, 2, 1, and 2. If the M precoding matrices do not follow a sequence, it indicates that the M precoding matrices configured by using the first configuration information include two precoding matrices 1 and two precoding matrices 2. It should be noted that, for ease of description, if there is no special description in the following, an example in which the M precoding matrices follow a sequence is used for description. Unified descriptions are provided herein, and details are not described in the following again.

For example, this embodiment is applied to the non-codebook-based uplink transmission mode. It can be learned with reference to the foregoing descriptions that the network device may configure the precoding matrix by configuring an SRS index for a terminal. Optionally, at least two of M SRS indexes configured by the network device are different.

In this optional implementation, there may be same SRS indexes in the M SRS indexes. In addition, the M SRS indexes may be different. Optionally, the M SRS indexes configured by the network device may follow a sequence, or may not follow a sequence. It may be understood that, in the non-codebook-based uplink transmission mode, the precoding matrix is designed by the terminal, so that precoding matrices indicated by different SRS indexes may be the same or may be different. Whether the precoding matrices are the same depends on a design of the terminal.

S102: The network device sends the first configuration information.

A specific message in which the first configuration information is carried for sending is not limited in this embodiment of this application. For example, the first configuration information may be carried in at least one of RRC signaling, MAC CE signaling, or DCI for sending. For example, the first configuration information may be carried in one or more messages in the prior art for sending, or may be carried in one or more messages newly designed in this application for sending. For a specific example, refer to the following descriptions.

The first configuration information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by the network device by sending other configuration information (that is, not the first configuration information) to the terminal. The other configuration information may include, for example, but is not limited to, one or a combination of at least two of RRC signaling, MAC CE signaling, or DCI. For example, the first configuration information includes RRC signaling and DCI. A precoding matrix indicated by the DCI may be first repeated through configuration by using the RRC signaling, and a quantity of repetitions is 2. Then, precoding matrices 1 and 2 are configured by using the DCI. In this way, the M precoding matrices configured by using the first configuration information may be precoding matrices 1, 2, 1, and 2. A sending periodicity of the RRC signaling is longer than a sending periodicity of the DCI.

S103: The terminal receives the first configuration information.

S104: The terminal aggregately sends a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer. A quantity X of transmission layers of the signal may be an integer greater than or equal to 1. In other words, in this embodiment of this application, a technical solution in which a quantity of transmission layers of a signal in a time domain aggregation transmission mode is greater than 1 is supported, and a technical solution in which a quantity of transmission layers of a signal in a time domain aggregation transmission mode is equal to 1 is also supported.

That the terminal aggregately sends a signal in N time domain units may be understood as: The terminal sends a same signal in the N time domain units. The signal may be, for example, data transmitted on a PUSCH. In this case, the quantity X of transmission layers of the signal may be understood as a PUSCH rank. A precoding matrix corresponding to a time domain unit is a precoding matrix used to precode a signal sent in the time domain unit. Usually, one time domain unit corresponds to one precoding matrix, and precoding matrices corresponding to different time domain units may be the same or may be different.

In the precoding matrix configuration method provided in this embodiment of this application, in the time domain aggregation transmission mode, the network device may configure at least two precoding matrices for the terminal, and the terminal may aggregately send the signal in the N time domain units based on the first configuration information. A precoding matrix corresponding to each time domain unit is one of the M precoding matrices. This creates a condition for implementing a difference between precoding matrices corresponding to at least two of the N aggregated time domain units. Different precoding matrices may represent different channel conditions, and a higher matching degree between a precoding matrix and an actual channel condition leads to higher performance of decoding data. Therefore, in a plurality of aggregated time domain units, if a channel condition changes or a position of the terminal moves, and so on, compared with a prior-art technical solution in which only one precoding matrix is used to precode data, this technical solution helps improve performance of decoding received data by the network device, so as to improve uplink performance of the terminal, and improve performance or uplink coverage of the terminal at a cell edge.

The following describes a specific implementation of the first configuration information. For details, refer to any one of the following manner 1 to manner 3.

Manner 1: The first configuration information is DCI. The DCI may be similar to DCI that triggers the $1^{st}$ slot (or mini-slot) in a slot aggregation transmission mode. Details are as follows:

If an Uplink Transmission Mode is the Non-Codebook-Based Uplink Transmission Mode, the DCI May Include First Indication Information.

The first indication information is used to indicate M SRIs, and the M SRIs are used to configure the M precoding matrices. For example, with reference to FIG. 3, the first indication information may be information carried in an SRI field included in the DCI. In other words, in this embodiment of this application, a technical solution in which in a non-codebook-based uplink transmission mode and in a time domain aggregation transmission mode, an SRI field indicates a plurality of SRIs is supported.

For example, the SRI field may carry an index, the index is used to indicate the M SRIs, and each SRI may be used to configure one precoding matrix. For example, in an existing 5G NR technology, because a slot aggregation transmission mode supports only a PUSCH rank=1, based on the foregoing Table 1 (in Table 1, L_max=3), if $N_{SRS}$=4, in the slot aggregation transmission mode, an index carried in an SRI field may be any one of indexes 0 to 3. However, in this optional manner, assuming that the PUSCH rank=1, the index carried in the SRI field may be any one of indexes 4 to 13. Certainly, in this example, the PUSCH rank may alternatively be greater than 1. For example, in an existing 5G NR technology, because a slot aggregation transmission mode supports only a PUSCH rank=1, the network device may indicate that L_max=1, and if $N_{SRS}$=4, in the slot aggregation transmission mode, an index carried in an SRI field may be any one of indexes 0 to 3. However, in this optional manner, assuming that the PUSCH rank=1, the index carried in the SRI field corresponds to at least one SRI.

For example, the SRI field may carry M indexes, and each index is used to indicate one SRI. For example, based on the foregoing example, in the existing 5G NR technology, referring to Table 1, if $N_{SRS}=4$, in the slot aggregation transmission mode, the index carried in the SRI field may be any one of the indexes 0 to 3. However, in this optional manner, assuming that the PUSCH rank=1, the index carried in the SRI field may be a combination of any two or more of indexes 0 to 3. For example, indexes carried in the SRI field are indexes 0 and 1. Certainly, in this example, the PUSCH rank may alternatively be greater than 1.

It should be noted that in any embodiment of this application, an applicable table of SRI indication for non-codebook-based PUSCH transmission may be a related table provided in the prior art, or may be a newly designed table.

If the uplink transmission mode is the codebook-based uplink transmission mode, the DCI may include second indication information. For example, with reference to FIG. 4, the second indication information may be information carried in a precoding information and quantity of layers field included in the DCI. The second indication information may be implemented in the following manner 1 or manner 2.

Manner 1: The second indication information is used to indicate M TPMIs, and each TPMI is used to configure one precoding matrix with X columns. X is the quantity of transmission layers of the signal, $X \geq 1$, and X is an integer. In other words, in this embodiment of this application, a technical solution in which in a codebook-based uplink transmission mode and in a time domain aggregation transmission mode, a precoding information and quantity of layers field indicates a plurality of TPMIs is supported.

For example, the precoding information and quantity of layers field may carry one index, the index is used to indicate M TPMIs, and each TPMI is used to configure one precoding matrix with X columns. For example, with reference to Table 2, a table cell corresponding to an index 9 may be set to: 1 layer, TPMI=0, and TPMI=1, to indicate that the PUSCH rank=1, and the TPMI may be equal to 0 or 1. In this example, it can be learned from "1 layer" that the quantity X of transmission layers of the signal is equal to 1. In this example, each TPMI corresponds to one precoding matrix with one column.

For example, the precoding information and quantity of layers field may carry M indexes, each index is used to indicate one TPMI, and each TPMI is used to configure one precoding matrix with X columns. For example, because a slot aggregation transmission mode supports only a PUSCH rank=1, based on the foregoing Table 2, an index carried in a precoding information and quantity of layers field may be any one of indexes 0, 1, and 3 to 6. In this example, assuming that the PUSCH rank=1, the index carried in the precoding information and quantity of layers field may be a combination of any two or more of indexes 0, 1, and 3 to 6. For example, the index carried in the precoding information and quantity of layers field may be indexes 0 and 4. Certainly, in this example, the PUSCH rank may alternatively be greater than 1. In addition, in Table 2, maxRank=2. However, based on a reason similar to the foregoing example, this solution is also applicable to a table corresponding to maxRank=1.

Manner 2: The second indication information is used to indicate one TPMI, the TPMI is used to configure one precoding matrix with M*X columns, and each of the M precoding matrices is one precoding matrix with X columns in the precoding matrix with M*X columns. X is the quantity of transmission layers of the signal, $X \geq 1$, and X is an integer. In other words, in this embodiment of this application, a technical solution in which a PUSCH precoding matrix is a matrix including some columns in a precoding matrix indicated by a TPMI is supported.

For example, the precoding information and quantity of layers field may carry one index, the index is used to indicate one precoding matrix with M*X columns, and the M precoding matrices configured by using the first configuration information may be separately: a matrix including the first column to the $X^{th}$ column in the precoding matrix with M*X columns, a matrix including the $(X+1)^{th}$ column to the $(2X)^{th}$ column in the precoding matrix with M*X columns, . . . , and a matrix including the $[(M-1)(X+1)]^{th}$ column to the $(M*X)^{th}$ column in the precoding matrix with M*X columns. Certainly, this application is not limited thereto. A specific matrix that includes specific X columns in the precoding matrix with M*X columns and that is used as one of the M precoding matrices configured by using the first configuration information may be agreed on by the network device and the terminal in advance, may be configured by the network device for the terminal by using signaling, or may be determined by the terminal itself.

The following describes the quantity X of transmission layers of the signal.

In this application, the quantity X of transmission layers of the signal (for example, the PUSCH rank) may be equal to 1, or may be greater than 1.

If the uplink transmission mode is the non-codebook-based uplink transmission mode, in an embodiment of this application, in a preset (or default) time domain aggregation transmission mode, the quantity X of transmission layers of the signal is equal to 1. In other words, the quantity X of transmission layers of the signal is equal to 1 regardless of whether a quantity of SRIs indicated by the SRI field is 1. In other words, in this embodiment of this application, a technical solution in which a quantity of SRIs indicated by an SRI field is not equal to a PUSCH rank is supported. In a current 5G standard, a quantity of SRIs indicated by an SRI field is equal to a PUSCH rank. For example, refer to Table 1. In this embodiment, optionally, that X=1 may not need to be indicated by using DCI. In other words, the terminal may not determine a value of the quantity X of transmission layers based on a table of SRI indication for non-codebook-based PUSCH transmission, for example, Table 1. In another embodiment of this application, the quantity of SRIs indicated by the SRI field is equal to X. Certainly, this application is not limited thereto. For example, in the preset (or default) time domain aggregation transmission mode, the quantity X of transmission layers of the signal may alternatively have a value greater than 1. For example, X=2, 3, or 4.

If the uplink transmission mode is the codebook-based uplink transmission mode, in an embodiment of this application, in a preset (or default) time domain aggregation transmission mode, the quantity X of transmission layers of the signal is equal to 1. In this embodiment, optionally, that X=1 may be indicated by using the index carried in the precoding information and quantity of layers field in the DCI. In other words, it may be considered that a quantity, of layers, included in a table cell corresponding to an index in a table of precoding information and quantity of layers, for example, in Table 2, is 1. Certainly, this application is not limited thereto. For example, in the preset (or default) time domain aggregation transmission mode, the quantity X of transmission layers of the signal may alternatively have a value greater than 1. For example, X=2, 3, or 4.

The following describes a number of a DMRS port (that is, a number of a DMRS port used to transmit the signal).

Optionally, based on any one of the foregoing manners, the DCI further includes third indication information, and the third indication information is used to indicate the number of the DMRS port used to send the signal. For example, with reference to FIG. 2 or FIG. 3, the third indication information may be information carried in an antenna port field included in the DCI. The third indication information may be implemented in the following manner a or manner b.

Manner a: The number, of the DMRS port, indicated by the third indication information is X numbers, of DMRS ports, that are corresponding to the third indication information and that are determined in antenna port information that is based on X transmission layers.

For example, it is assumed that the uplink transmission mode is the non-codebook-based uplink transmission mode. In this case, based on the manner a, the terminal needs to first determine the antenna port information that is based on the X transmission layers. For example, if X=1, in the 5G standard, antenna port information that is based on X (X=1) transmission layers may be Table 7.3.1.1.2-12, as shown in Table 4. It can be learned from Table 4 that if an index carried in the antenna port field is an index 5, the number, of the DMRS port, indicated by the third indication information is a number 3 of an antenna port. For example, if X=2, in the 5G standard, antenna port information that is based on X (X=2) transmission layers may be Table 7.3.1.1.2-13, as shown in Table 5. It can be learned from Table 5 that if an index carried in the antenna port field is an index 5, the number, of the DMRS port, indicated by the third indication information is a number 2 of an antenna port or a number 3 of an antenna port.

Manner b: The number, of the DMRS port, indicated by the third indication information is X numbers, of DMRS ports, at a first preset position in a DMRS port number set, where the DMRS port number set is a DMRS port number set that is corresponding to the third indication information and that is determined in antenna port information that is based on M*X transmission layers.

One DMRS port number set includes X numbers of DMRS ports. For example, referring to Table 5, X=1, and each DMRS set includes two numbers, of DMRS ports, included in one row in Table 5. Numbers of DMRS ports in each DMRS port number set may follow a sequence. For example, the sequence may be a sequence recorded in a table of antenna port information, for example, in Table 5.

The X numbers, of DMRS ports, at the first preset position in the DMRS port number set may be any X numbers of DMRS ports in the DMRS port number set, for example, first X numbers of DMRS ports, last X numbers of DMRS ports, or X consecutive numbers, of DMRS ports, starting from a specific port number. X specific numbers of DMRS ports may be agreed on by the network device and the terminal in advance, or may be configured by the network device for the terminal by using signaling. For example, a DMRS port number set corresponding to an index 5 in Table 5 includes a number 2 of a DMRS port and a number 3 of a DMRS port. In the DMRS port number set, the $1^{st}$ number of a DMRS port is the number 2 of the DMRS port, and the $2^{nd}$ number of a DMRS port is the number 3 of the DMRS port. If the first preset position indicates the first X numbers of the DMRS ports in the DMRS port number set, the number, of the DMRS port, indicated by the third indication information is the number 2 of the DMRS port. If the first preset position indicates the last X numbers of the DMRS ports in the DMRS port number set, the number, of the DMRS port, indicated by the third indication information is the number 3 of the DMRS port.

For example, it is assumed that the uplink transmission mode is the non-codebook-based uplink transmission mode, X=1, and M=2. In this case, based on the manner b, the terminal needs to first determine antenna port information that is based on M*X (M*X=2) transmission layers. For example, in the 5G standard, antenna port information that is based on two transmission layers may be shown in Table 7.3.1.1.2-13, for example, shown in Table 5. It can be learned from Table 5 that if an index carried in the antenna port field is an index 5, the number, of the DMRS port, indicated by the third indication information is a number 2 of an antenna port or a number 3 of an antenna port.

For example, it is assumed that the uplink transmission mode is the non-codebook-based uplink transmission mode, X=2, and M=2. In this case, based on the manner b, the terminal needs to first determine antenna port information that is based on M*X (M*X=4) transmission layers. For example, in the 5G standard, antenna port information that is based on four transmission layers may be shown in "Table 7.3.1.1.2-15 Antenna port(s), transformPrecoder=disabled, dmrs-Type=1, maxLength=2, rank=4". A part of Table 7.3.1.1.2-15 is shown in Table 6. Referring to Table 6, if an index carried in the antenna port field is an index 3, a DMRS port number set corresponding to the index 3 includes numbers 0, 2, 4, and 6 of antenna ports. In this case, if the first preset position indicates the first X numbers of the DMRS ports in the DMRS port number set, the number, of the DMRS port, indicated by the third indication information may be the numbers 0 and 2 of antenna ports; if the first preset position indicates the last X numbers of the DMRS ports in the DMRS port number set, the number, of the DMRS port, indicated by the third indication information may be the numbers 4 and 6 of antenna ports.

TABLE 6

| Index | DMRS port |
| --- | --- |
| 0 | 0-3 |
| 1 | 0, 1, 4, 5 |
| 2 | 2, 3, 6, 7 |
| 3 | 0, 2, 4, 6 |
| 4-15 | Reserved |

It should be noted that during specific implementation, whether the number, of the DMRS port, indicated by the third indication information is determined based on the manner a or the manner b may be predetermined by the network device and the terminal, or may be configured by the network device for the terminal by using signaling. This is not limited in this application.

Manner 2: The M precoding matrices are obtained by repeating a precoding matrix group, a quantity of repetitions may be 0, 1, or an integer greater than 1, and the precoding matrix group includes at least two precoding matrices. The first configuration information configures the M precoding matrices by configuring one or more offsets, a first precoding matrix in the precoding matrix group, and the quantity of repetitions of the precoding matrix group. The offset is an offset of a number of a precoding matrix in the precoding matrix group relative to a number of another precoding matrix in the precoding matrix group.

The first precoding matrix may be any precoding matrix in the precoding matrix group, for example, the $1^{st}$ precoding matrix, the last precoding matrix, a precoding matrix with a smallest number, or a precoding matrix with a largest number in the precoding matrix group. A specific precoding matrix that is the first precoding matrix in the precoding matrix group may be agreed on by the network device and the terminal in advance, for example, agreed on in a protocol, or may be configured by the network device for the terminal by using signaling. Optionally, the first precoding matrix is usually the $1^{st}$ precoding matrix in the precoding matrix group. For ease of description, that the first precoding matrix is the $1^{st}$ precoding matrix in the precoding matrix group is used as an example for description. Unified descriptions are provided herein, and details are not described in the following again.

A manner of configuring the first precoding matrix may be, for example, but is not limited to, a manner of configuring a precoding matrix by the network device for the terminal in the prior art. For example, if the uplink transmission mode is the non-codebook-based uplink transmission mode, the network device may still configure a precoding matrix in a manner, in the current 5G standard, in which a precoding matrix is configured when an SRI=1. For another example, if the uplink transmission mode is the codebook-based uplink transmission mode, the network device may still configure a precoding matrix in a manner, in the current 5G standard, in which a precoding matrix is configured when a TPMI=1. In other words, in this embodiment of this application, the following technical solution is supported: The network device still indicates a precoding matrix in the manner in the prior art, and agrees on, in advance, or configures other information (for example, a periodicity and/or an offset of the precoding matrix), so that the terminal obtains the M precoding matrices. For example, in this manner, for a manner of determining the quantity X of transmission layers of the signal, the DMRS port, or the like, refer to the existing 5G standard. Certainly, this application is not limited thereto.

Optionally, the network device may configure the offset and the quantity of repetitions of the precoding matrix group for the terminal by using RRC signaling or MAC CE signaling, and configure the first precoding matrix in the precoding matrix group for the terminal by using DCI. In this case, a part of information in the first configuration information may be carried in the RRC signaling or the MAC CE signaling, and the other part of information is carried in the DCI. Certainly, this application is not limited thereto.

The offset may be an integer greater than, equal to, or less than 0. The following provides several specific implementations of the offset.

In a first manner, the offset may be a maximum offset of a number of another precoding matrix in the precoding matrix group relative to a number of the first precoding matrix. In this case, a difference between numbers of two adjacent precoding matrices in the precoding matrix group may be agreed on in advance, or a difference between numbers of two adjacent precoding matrices in the preset precoding matrix group may be configured by using signaling (for example, at least one of RRC signaling, MAC CE signaling, or DCI), and the difference may be greater than, equal to, or less than 0.

For example, it is assumed that numbers of precoding matrices may be 0 to 3, the first precoding matrix is a precoding matrix 0, the difference, agreed on in advance, between numbers of two adjacent precoding matrices in the precoding matrix group is 1, and the quantity of repetitions of the precoding matrix group is 2. In this case, if the maximum offset is 3, the precoding matrix group includes precoding matrices 0, 1, 2, and 3, and precoding matrices configured by using the first configuration information are precoding matrices 0, 1, 2, 3, 0, 1, 2, and 3; if the maximum offset is 2, the precoding matrix group includes precoding matrices 0, 1, and 2, and precoding matrices configured by using the first configuration information are precoding matrices 0, 1, 2, 0, 1, and 2.

For example, it is assumed that numbers of precoding matrices may be 0 to 3, the first precoding matrix is a precoding matrix 2, the difference, agreed on in advance, between numbers of two adjacent precoding matrices in the precoding matrix group is 1, and the quantity of repetitions of the precoding matrix group is 2. In this case, if the maximum offset is 3, the precoding matrix group includes precoding matrices 2, 3, 0, and 1, and precoding matrices configured by using the first configuration information are precoding matrices 2, 3, 0, 1, 2, 3, 0, and 1.

For example, it is assumed that numbers of precoding matrices may be 0 to 3, the first precoding matrix is a precoding matrix 2, the difference, configured by using RRC signaling, between numbers of two adjacent precoding matrices in the precoding matrix group is −1, and the quantity of repetitions of the precoding matrix group is 2. In this case, if the maximum offset is 3, the precoding matrix group includes precoding matrices 2, 1, 0, and 3, and precoding matrices configured by using the first configuration information are precoding matrices 2, 1, 0, 3, 2, 1, 0, and 3.

In a second manner, the offset may be an offset of a number of each precoding matrix, other than the first precoding matrix, in the precoding matrix group relative to a number of the first precoding matrix.

For example, it is assumed that the first precoding matrix is a precoding matrix 0, offsets configured by using the first configuration information are separately 1, 2, and 4, and the quantity of repetitions of the precoding matrix group is 2. In this case, the precoding matrix group includes precoding matrices 0, 1, 2, and 4, and precoding matrices configured by using the first configuration information are precoding matrices 0, 1, 2, 4, 0, 1, 2, and 4.

For example, it is assumed that the first precoding matrix is a precoding matrix 2, offsets configured by using the first configuration information are separately 1, 0, and −1, and the quantity of repetitions of the precoding matrix group is 2. In this case, the precoding matrix group includes precoding matrices 2, 3, 2, and 1, and precoding matrices configured by using the first configuration information are precoding matrices 2, 3, 2, 1, 2, 3, 2, and 1.

In a third manner, the offset may be an offset of a number of a latter precoding matrix in two adjacent precoding matrices in the precoding matrix group relative to a number of a former precoding matrix in the two adjacent precoding matrices.

For example, it is assumed that the first precoding matrix is a precoding matrix 0, offsets configured by using the first configuration information are separately 1, 2, and 4, and the quantity of repetitions of the precoding matrix group is 2. In this case, the precoding matrix group includes precoding matrices 0, 1, 3, and 7, and precoding matrices configured by using the first configuration information are precoding matrices 0, 1, 3, 7, 0, 1, 3, and 7.

It should be noted that the "precoding matrix group" in this application is a logical concept introduced to clearly describe the technical solutions provided in this application, and is a logical concept introduced to clearly describe the technical solution that is shown in the manner 2 and that is provided in this application or a variation thereof. It may be understood that, during actual implementation, the network device and the terminal may not perform an action of grouping precoding matrices, and the technical solution that is shown in the manner 2 and that is described in this application or a variation thereof that are designed in any manner shall fall within the protection scope of this application.

Manner 3: A specific implementation of the first configuration information when the terminal is in a fallback mode.

It should be noted that the DCI described above, for example, the DCI shown in FIG. 3 or FIG. 4, is common DCI such as DCI format 0_1 in the 5G NR. During actual implementation, when the terminal is in a fallback mode (for example, the network device configures the terminal to enter the fallback mode when a channel condition of the terminal is extremely poor), DCI sent by the network device to the terminal is simplified DCI, for example, DCI format 0_0 in the 5G NR, and only the rank=1 is used for transmission. In this case, the DCI does not include an antenna port field (the terminal uses a DMRS port 0 by default), and the DCI does not include a field indicating an SRI or a TPMI. Consequently, the terminal cannot be notified, by using the DCI, of a precoding matrix used for time domain aggregation transmission.

Therefore, this embodiment of this application provides the following technical solution.

Optionally, the fallback mode usually occurs in a non-first time of aggregation transmission. Therefore, optionally, if the network device configures the terminal to enter the rollback mode, the terminal may use, by default, precoding matrices that are corresponding to the N time domain units and that are determined in a previous time of aggregation transmission as precoding matrices corresponding to the N time domain units in this time of aggregation transmission. A schematic diagram of a plurality of times of aggregation transmission may be shown in FIG. 6. In this optional implementation, first configuration information in this time of aggregation transmission may be DCI in the previous time of aggregation transmission.

Optionally, the first configuration information may be carried in signaling (for example, RRC signaling in FIG. 6) used to configure that the terminal needs to perform uplink transmission based on a time domain aggregation transmission mode, or signaling (for example, RRC signaling in FIG. 6) used to configure a value of N for the terminal. In this case, if the network device configures the terminal to enter the fallback mode, the terminal uses M precoding vectors configured by using the RRC signaling. In other words, in this embodiment of this application, a technical solution in which M precoding vectors are configured in signaling used to configure that uplink transmission needs to be performed based on a time domain aggregation transmission mode and/or signaling used to configure a value of N is supported.

The Following Describes Manners in which the Terminal Determines, Based on the M Precoding Matrices, N Precoding Matrices Corresponding to the N Time Domain Units.

Figure 8:
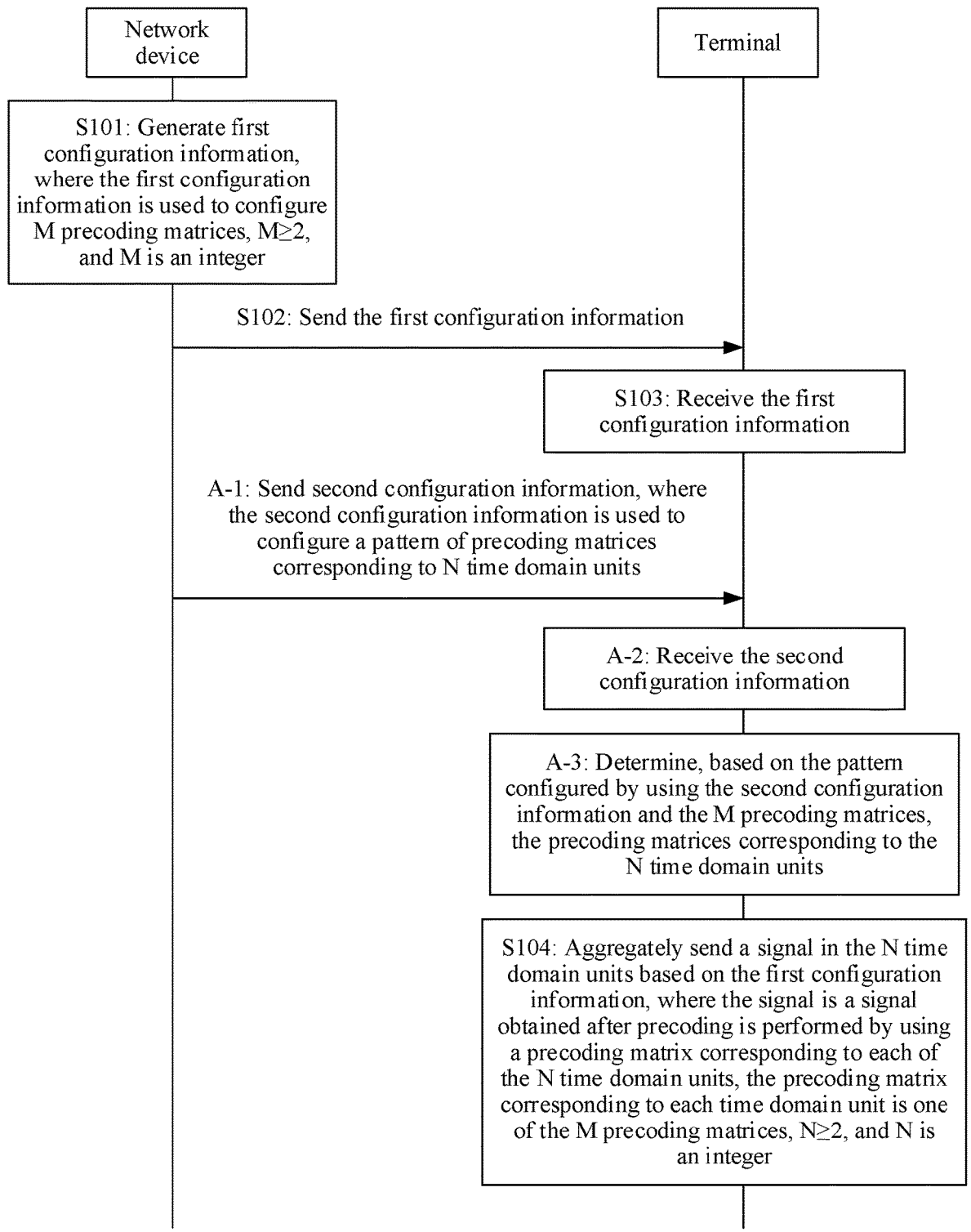
FIG. 8 is a second schematic flowchart of a precoding matrix configuration method according to an embodiment of this application.

Manner 1: The network device configures, for the terminal, N precoding matrices corresponding to the N time domain units by configuring, for the terminal, a pattern of precoding matrices corresponding to the N time domain units. As shown in FIG. 8, before S104, the foregoing method may further include the following operations.

A-1: The network device sends second configuration information to the terminal, where the second configuration information is used to configure a pattern of precoding matrices corresponding to the N time domain units, and the pattern is designed based on M.

The pattern of the precoding matrices corresponding to the N time domain units is a design rule of the precoding matrices corresponding to the N time domain units. For example, the pattern may include, but is not limited to, at least one of the following: numbers of the precoding matrices corresponding to the N time domain units, a sequence of the precoding matrices corresponding to the N time domain units, offsets of numbers of precoding matrices corresponding to the last (N−1) of the N time domain units relative to a number of a precoding matrix corresponding to the $1^{st}$ time domain unit, or the like.

For example, the network device and the terminal may agree on in advance at least two patterns, designed based on M, of the precoding matrices corresponding to the N time domain units, and a correspondence between each of the at least two patterns and an index (for example, a binary number or a name of the pattern) of the pattern. For example, assuming that N=4, the at least two patterns, agreed on in advance, of the precoding matrices corresponding to the N time domain units may be ABAB, AABB, BABA, and BBAA, where A and B are numbers of the precoding matrices, and A<B. Then, one of the at least two patterns is indicated to the terminal by performing operation A-1.

The second configuration information may be an index of the pattern of the precoding matrices corresponding to the N time domain units. The second configuration information may be carried in, for example, but not limited to at least one of RRC signaling, MAC CE signaling, or DCI for sending. Optionally, the second configuration information may be carried in the RRC signaling or the MAC CE signaling for sending. The at least two patterns that may be agreed on by the network device and the terminal in advance may be some or all possible patterns, designed based on M, of the precoding matrices corresponding to the N time domain units.

It may be understood that sending periodicities and/or sending occasions of the second configuration information and the first configuration information may be the same, or may be different. Usually, a sending periodicity of the second configuration information may be longer than a sending periodicity of the first configuration information. A specific sending method is not limited in this application.

A-2: The terminal receives the second configuration information.

A-3: The terminal determines, based on the pattern configured by using the second configuration information and the M precoding matrices, the precoding matrices corresponding to the N time domain units.

For example, if the M precoding matrices are precoding matrices 1 and 2, the pattern configured by using the second configuration information is ABAB, and A<B, the precoding matrices that are corresponding to the N time domain units and that are determined by the terminal by performing operation A-3 are precoding matrices 1, 2, 1, and 2.

It should be noted that a sequence of operations A-1 to A-3 and operations S101 to S103 is not limited in this application. For example, the operations A-1 to A-3 may be performed before the operations S101 to S103, or the operations S101 to S103 may be performed before the operations A-1 to A-3, or a part or all of the operations S101 to S103 may be performed in a process of performing the operations A-1 to A-3, or a part or all of operations A-1 to A-3 are performed in a process of performing the operations S101 to S103. In FIG. 8, that the operations S101 to S103 are performed before the operations A-1 to A-3 is used as an example for description.

Figure 9:
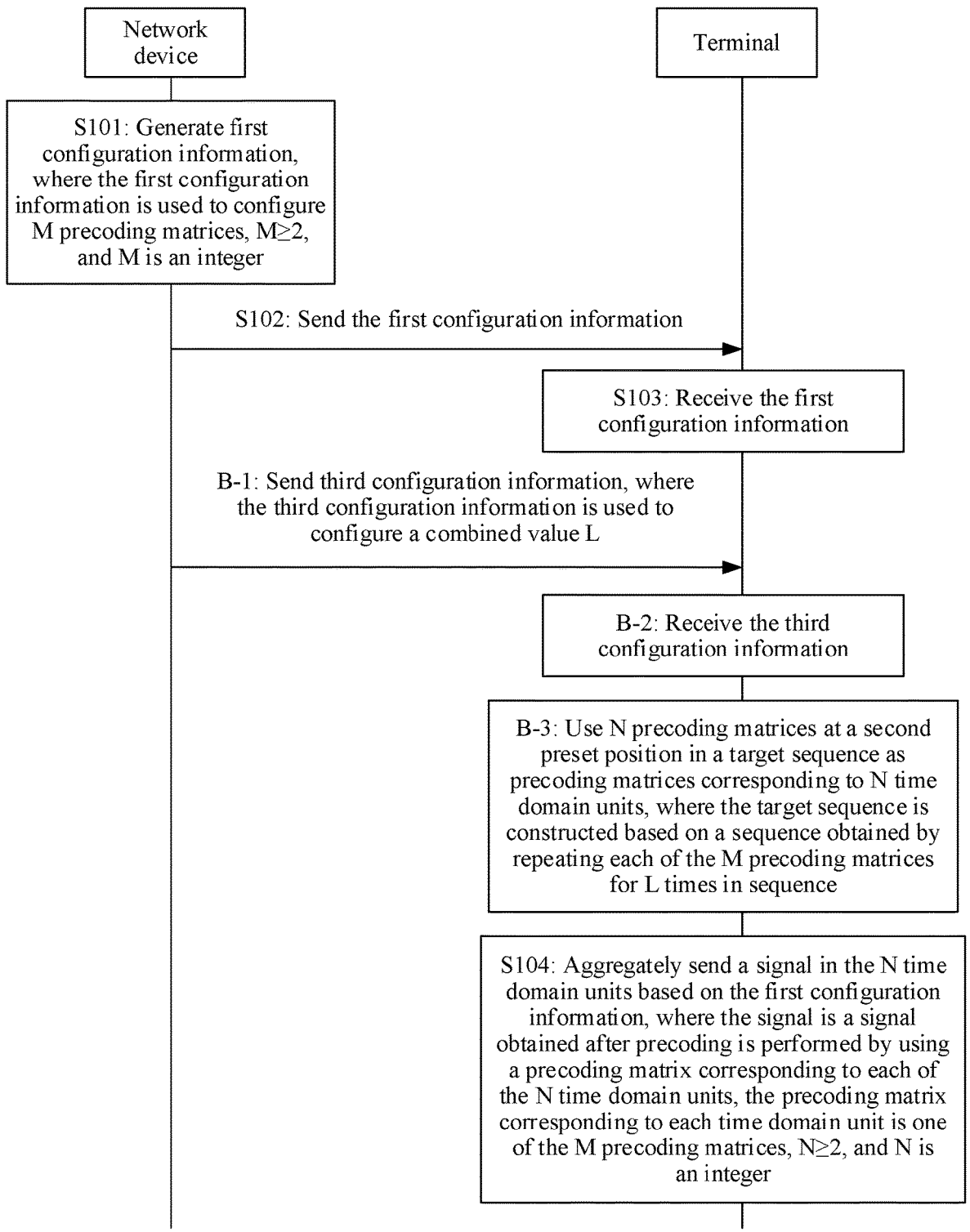
FIG. 9 is a third schematic flowchart of a precoding matrix configuration method according to an embodiment of this application.

Manner 2: The network device configures, for the terminal, N precoding matrices corresponding to the N time domain units by configuring a combined value for the terminal. As shown in FIG. 9, before S104, the foregoing method may further include the following operations.

B-1: The network device sends third configuration information to the terminal, where the third configuration information is used to configure a combined value L. L is an integer greater than or equal to 2. The combined value is used to indicate a quantity, of repetitions of each precoding matrix, configured by using the first configuration information.

The third configuration information may be carried in, for example, but not limited to, at least one of RRC signaling, MAC CE signaling, or DCI for sending. Optionally, the third configuration information may be carried in the RRC signaling or the MAC CE signaling for sending.

B-2: The terminal receives the third configuration information.

B-3: The terminal uses N precoding matrices at a second preset position in a target sequence as precoding matrices corresponding to the N time domain units, where the target sequence is constructed based on a sequence (referred to as a first sequence below) obtained by repeating each of the M precoding matrices for L times in sequence. For example, it is assumed that the M precoding matrices are two precoding matrices, and the two precoding matrices are precoding matrices 1 and 2. In this case, if L=2, the first sequence may be precoding matrices 1, 1, 2, and 2; if L=3, the first sequence may be precoding matrices 1, 1, 1, 2, 2, and 2.

Optionally, if a quantity of precoding matrices included in the first sequence is greater than or equal to N, the target sequence is the first sequence. For example, if N=4, and the first sequence includes precoding matrices 1, 1, 2, and 2, the target sequence includes precoding matrices 1, 1, 2, and 2.

Optionally, if a quantity of precoding matrices included in the first sequence is less than N, the target sequence is a sequence obtained by repeating the first sequence for K times, where K is an integer greater than or equal to 2. Optionally, a value of K is a value that minimizes the quantity of precoding matrices included in the target sequence. For example, if N=8, and the first sequence includes precoding matrices 1, 1, 2, and 2, the target sequence is a sequence obtained by repeating the first sequence for two times (that is, K=2), to be specific, the target sequence includes precoding matrices 1, 1, 2, 2, 1, 1, 2, and 2. For another example, if N=8, and the first sequence includes precoding matrices 1, 1, 1, 2, 2, and 2, the target sequence is a sequence obtained by repeating the first sequence for two times (that is, K=2), to be specific, the target sequence includes precoding matrices 1, 1, 1, 2, 2, 2, 1, 1, 1, 2, 2, and 2.

The N precoding matrices at the second preset position in the target sequence may be any N precoding matrices in the target sequence, for example, the first N precoding matrices, the last N precoding matrices, or N consecutive precoding matrices starting from a specific precoding matrix in the target sequence. This is not limited in this embodiment of this application. For example, if the N precoding matrices at the second preset position in the target sequence are the first N precoding matrices in the target sequence, N=8, and the target sequence includes precoding matrices 1, 1, 1, 2, 2, 2, 1, 1, 1, 2, 2, and 2, the N precoding matrices that are corresponding to the N time domain units and that are determined by the terminal may be precoding matrices 1, 1, 1, 2, 2, 2, 1, and 1.

It should be noted that in the manner 2, that the network device configures the combined value for the terminal is used as an example for description. During actual implementation, the combined value may alternatively be agreed on by the network device and the terminal in advance, for example, agreed on in advance in a protocol.

In addition, it should be noted that the target sequence in this manner is equivalent to a concept of the precoding matrices that are corresponding to the N time domain units and that are determined by the terminal. In this application, there is a design rule of representing the precoding matrices corresponding to the N time domain units by using the "pattern" or the "target sequence". It may be understood that a name of the design rule does not constitute a limitation on the design rule. During specific implementation, the name of the design rule may alternatively be another name.

Manner 3: The network device and the terminal may agree on the following rules in advance.

If M≥N, precoding matrices corresponding to the N time domain units are N precoding matrices at a third preset position in the M precoding matrices. For example, the precoding matrices corresponding to the N time domain units may be the first N precoding matrices, the last N precoding matrices, or several consecutive precoding matrices starting from a specific precoding matrix in the M precoding matrices.

If M<N, precoding matrices corresponding to the N time domain units are N precoding matrices at a fourth preset position in a sequence obtained by repeating the M precoding matrices. For example, the precoding matrices corresponding to the N time domain units may be the first N precoding matrices, the last N precoding matrices, or several consecutive precoding matrices starting from a specific precoding matrix in the sequence obtained by repeating the M precoding matrices.

The sequence obtained by repeating the M precoding matrices may be a sequence obtained by repeating each of the M precoding matrices for several times in sequence. For example, if the M precoding matrices are precoding matrices 1 and 2, a sequence obtained by repeating the M precoding matrices for two times are precoding matrices 1, 1, 2, and 2. Alternatively, the sequence obtained by repeating the M precoding matrices may be a sequence obtained by repeating the M precoding matrices as a whole for several times. For example, if the M precoding matrices are precoding matrices 1 and 2, a sequence obtained by repeating the M precoding matrices for two times are precoding matrices 1, 2, 1, and 2.

Optionally, a quantity of repetitions in the manner 3 may have a value that minimizes a quantity of precoding matrices included in the target sequence.

Manner 4: The first configuration information is used to indicate to determine precoding matrices corresponding to the N time domain units based on a sequence of the M precoding matrices. In this manner, the M precoding matrices follow a sequence, and the terminal determines the precoding matrices corresponding to the N time domain units based on the sequence.

Optionally, if M≥N, a precoding matrix corresponding to the $n^{th}$ time domain unit in the N time domain units may be the $n^{th}$ precoding matrix in the M precoding matrices, where 1≤n≤N, and n is an integer. Further optionally, M=N. In other words, the M precoding matrices configured by using the first configuration information are sequentially the precoding matrices corresponding to the N time domain units.

Optionally, if M<N, a precoding matrix corresponding to the $n^{th}$ time domain unit in the N time domain units may be the $n^{th}$ precoding matrix in a sequence obtained by repeating the M precoding matrices, where 1≤n≤N, and n is an integer. For how to repeat the M precoding matrices, refer to the foregoing descriptions. Details are not described herein again.

It should be noted that in the manner 4, that the network device configures a rule for the terminal by using the first configuration information is used as an example for description, where the rule is to determine the precoding matrices corresponding to the N time domain units based on the sequence of the M precoding matrices. During actual implementation, the rule may alternatively be agreed on by network device and the terminal in advance, for example, agreed on in advance in a protocol.

Manner 5: A precoding matrix corresponding to each of the N time domain units is any one of the M precoding matrices. In other words, in this embodiment of this application, random setting of the precoding matrix corresponding to each of the N time domain units is supported. Optionally, precoding matrices corresponding to at least two of the N time domain units are different.

It may be understood that, regardless of the non-codebook-based uplink transmission mode or the codebook-based uplink transmission mode, because the network device can obtain, based on a DMRS sent by the terminal, an equivalent channel obtained after precoding, even if the precoding matrix corresponding to each of the N time domain units is randomly set, the network device may also decode data obtained after precoding. An objective of indicating precoding matrices by the network device to the terminal is to enable the terminal to select a precoding matrix with better performance for data transmission, thereby improving system performance.

The foregoing mainly describes the solutions provided in the embodiments of this application from a perspective of the method. To implement the foregoing functions, the network device and the terminal each include a corresponding hardware structure and/or software module for performing each function. A person skilled in the art should easily be aware that, in combination with units and algorithm operations of the examples described in the embodiments disclosed in this application, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a precoding matrix configuration apparatus (including the terminal and the network device) may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used.

Figure 10:
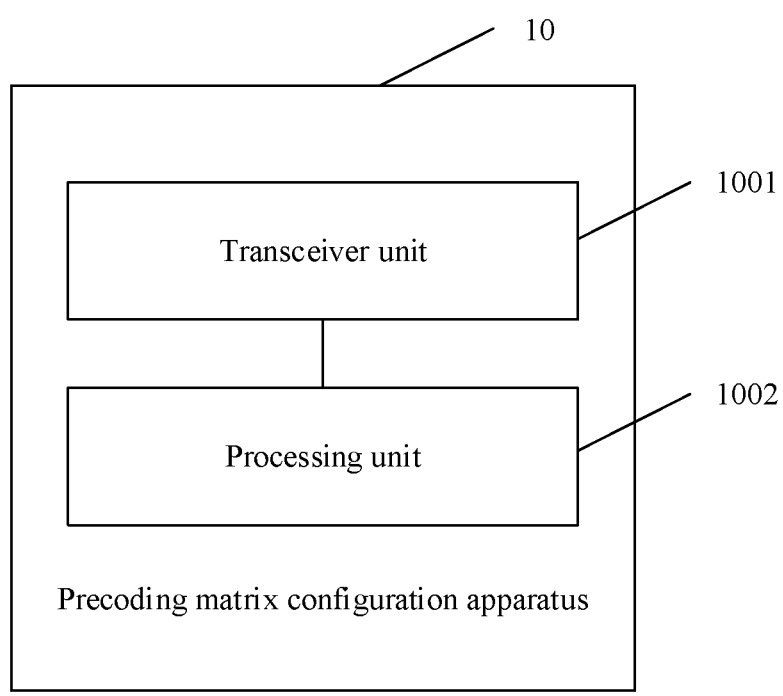
FIG. 10 is a schematic structural diagram of a precoding matrix configuration apparatus according to an embodiment of this application.

FIG. 10 is a schematic diagram of a precoding matrix configuration apparatus according to an embodiment of this application. The precoding matrix configuration apparatus 10 shown in FIG. 10 may be configured to perform operations performed by the terminal or the network device in the precoding matrix configuration method shown in any one of FIG. 7 to FIG. 9. The precoding matrix configuration apparatus 10 may include a transceiver unit 1001 and a processing unit 1002.

In some implementations of this application, the precoding matrix configuration apparatus 10 is a terminal.

The transceiver unit 1001 may be configured to receive first configuration information, where the first configuration information is used to configure M precoding matrices, M≥2, and M is an integer.

The processing unit 1002 may be configured to aggregately send a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

For example, with reference to any one of FIG. 7 to FIG. 9, the precoding matrix configuration apparatus 10 may be the terminal in FIG. 7 to FIG. 9. The transceiver unit 1001 may be configured to perform S103, and the processing unit 1002 may be configured to perform S104.

Optionally, the transceiver unit 1001 may be further configured to receive second configuration information, where the second configuration information is used to configure a pattern of precoding matrices corresponding to the N time domain units, and the pattern is designed based on M. The processing unit 1002 may be further configured to determine, based on the pattern configured by using the second configuration information and the M precoding matrices, the precoding matrices corresponding to the N time domain units. For example, with reference to FIG. 8, the transceiver unit 1001 may be configured to perform A-2, and the processing unit 1002 may be configured to perform A-3.

Optionally, the transceiver unit 1001 may be further configured to receive third configuration information, where the third configuration information is used to configure a combined value L. The processing unit 1002 may be further configured to use N precoding matrices at a second preset position in a target sequence as precoding matrices corresponding to the N time domain units, where the target sequence is constructed based on a sequence obtained by repeating each of the M precoding matrices for L times in sequence. For example, with reference to FIG. 9, the transceiver unit 1001 may be configured to perform B-2, and the processing unit 1002 may be configured to perform B-3.

In some other implementations of this application, the precoding matrix configuration apparatus 10 is specifically a network device.

The processing unit 1002 is configured to generate first configuration information, where the first configuration information is used to configure M precoding matrices, M≥2, and M is an integer.

The transceiver unit 1001 is configured to send the first configuration information, so that a terminal aggregately sends a signal in N time domain units based on the first configuration information, where the signal is a signal obtained after precoding is performed by using a precoding matrix corresponding to each of the N time domain units, the precoding matrix corresponding to each time domain unit is one of the M precoding matrices, N≥2, and N is an integer.

For example, with reference to any one of FIG. 7 to FIG. 9, the precoding matrix configuration apparatus 10 may be specifically the network device in FIG. 7 to FIG. 9. The processing unit 1002 may be configured to perform S101, and the transceiver unit 1001 may be configured to perform S102.

Optionally, the transceiver unit 1001 may be further configured to send second configuration information, where the second configuration information is used to configure a pattern of precoding matrices corresponding to the N time domain units, and the pattern is designed based on M, so that the terminal determines, based on the pattern configured by using the second configuration information and the M precoding matrices, the precoding matrices corresponding to the N time domain units. For example, with reference to FIG. 8, the transceiver unit 1001 may be configured to perform A-1.

Optionally, the transceiver unit 1001 may be further configured to send third configuration information, where the third configuration information is used to configure a combined value L, so that the terminal uses N precoding matrices at a second preset position in a target sequence as precoding matrices corresponding to the N time domain units, where the target sequence is constructed based on a sequence obtained by repeating each of the M precoding matrices for L times in sequence. For example, with reference to FIG. 9, the transceiver unit 1001 may be configured to perform operation B-1.

Regardless of whether the precoding matrix configuration apparatus 10 is specifically the terminal or the network device, the following provides several optional manners.

Optionally, the first configuration information is DCI, and if uplink transmission is non-codebook-based uplink transmission, the DCI includes first indication information, where the first indication information is used to indicate M sounding reference signal resource indicators SRIs, and the M SRIs are used to configure the M precoding matrices.

Optionally, the first configuration information is DCI, and if uplink transmission is codebook-based uplink transmission, the DCI includes second indication information, where the second indication information is used to indicate M transmitted precoding matrix indicators TPMIs, and each TPMI is used to configure one precoding matrix with X columns; or the second indication information is used to indicate one TPMI, the TPMI is used to configure one precoding matrix with M*X columns, and each of the M precoding matrices is one precoding matrix with X columns in the precoding matrix with M*X columns, where X is a quantity of transmission layers of the signal, $X \geq 1$, and X is an integer.

Optionally, the DCI may further include third indication information, and the third indication information is used to indicate a number of a demodulation reference signal DMRS port used to send the signal. The number, of the DMRS port, indicated by the third indication information is X numbers, of DMRS ports, that are corresponding to the third indication information and that are determined in antenna port information that is based on X transmission layers. Alternatively, the number, of the DMRS port, indicated by the third indication information is X numbers, of DMRS ports, at a first preset position in a DMRS port number set, where the DMRS port number set is a DMRS port number set that is corresponding to the third indication information and that is determined in antenna port information that is based on M*X transmission layers. X is the quantity of transmission layers of the signal, $X \geq 1$, and X is an integer.

Optionally, the M precoding matrices are obtained by repeating a precoding matrix group, the first configuration information is specifically used to configure one or more offsets, a first precoding matrix in the precoding matrix group, and a quantity of repetitions of the precoding matrix group, and the offset is an offset of a number of a precoding matrix in the precoding matrix group relative to a number of another precoding matrix in the precoding matrix group.

Optionally, if $M \geq N$, precoding matrices corresponding to the N time domain units are N precoding matrices at a third preset position in the M precoding matrices; or if M<N, precoding matrices corresponding to the N time domain units are N precoding matrices at a fourth preset position in a sequence obtained by repeating the M precoding matrices.

Optionally, the first configuration information is used to indicate to determine precoding matrices corresponding to the N time domain units based on a sequence of the M precoding matrices.

Optionally, the precoding matrix corresponding to each of the N time domain units is any one of the M precoding matrices. Optionally, precoding matrices corresponding to at least two of the N time domain units are different.

For explanations of related content, descriptions of beneficial effects, and the like in this embodiment, refer to the foregoing method embodiment. Details are not described herein again. For example, with reference to the communications device shown in FIG. 2, the transceiver unit 1001 may correspond to the communications interface 201 in FIG. 2. The processing unit 1002 may correspond to the processor 201 or the processor 207 in FIG. 2.

All or some of the foregoing embodiments may be implemented by using software, hardware, firmware, or any combination thereof. When software program is used to implement the embodiments, the embodiments may be implemented completely or partially in a form of a computer program product. The computer program product includes one or more computer instructions. When the computer-executable instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement other variations of the disclosed embodiments by viewing the accompanying drawings, disclosed content, and the accompanying claims. In the claims, "comprising" (comprising) does not exclude another component or another operation, and "a" or "one" does not exclude a case of "a plurality of". A single processor or another unit may implement several functions listed in the claims. Some measures are recorded in dependent claims that are different from each other, but this does not mean that these measures cannot be combined to produce a better effect.

Therefore, although this application is described with reference to specific features and the embodiments thereof, clearly, various modifications and combinations may be made to them without departing from the spirit and scope of this application. Correspondingly, this specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A precoding matrix configuration method, applied to uplink transmission, wherein the method comprises:
    receiving, by a terminal, first configuration information from a network device, wherein the first configuration information is used to configure M precoding matrices, wherein M is an integer that is equal to or bigger than 2; and
    wherein:
        in response to the uplink transmission is non-codebook-based uplink transmission, the first configuration information comprises first indication information, wherein the first indication information indicates M sounding reference signal resource indicators (SRIs), and wherein the M SRIs are used to configure the M precoding matrices;
        in response to the uplink transmission is codebook-based uplink transmission, the first configuration information comprises second indication information, wherein the second indication information indicates M transmit precoding matrix indicators (TPMIs), and wherein the M TPMIs are used to configure the M precoding matrices;
    aggregately sending, by the terminal, a same signal in each of N time domain units based on the first configuration information, wherein a precoding matrix of the M precoding matrices corresponds to a time domain unit of the N time domain units, and wherein, for each of the N aggregated time domain units, the same signal is precoded by using a precoding matrix corresponding to a time domain unit, wherein the precoding matrix corresponding to the time domain unit is one of the M precoding matrices.

2. The precoding matrix configuration method according to claim 1, wherein the first configuration information is downlink control information (DCI); and
    each of the M TPMIs is used to configure one precoding matrix with X columns; wherein X is a quantity of transmission layers of the signal, and wherein X is an integer that is equal to or greater than 1.

3. The precoding matrix configuration method according to claim 2, wherein the DCI further comprises third indication information indicates a number of a demodulation reference signal (DMRS) port used to send the signal; and
    wherein the number, of the DMRS port, indicated by the third indication information is X numbers, of DMRS ports, that are corresponding to the third indication information and that are determined in antenna port information that is based on X transmission layers; or
    wherein the number, of the DMRS port, indicated by the third indication information is X numbers, of DMRS ports, at a first preset position in a DMRS port number set, wherein the DMRS port number set is a DMRS port number set that is corresponding to the third indication information and that is determined in antenna port information that is based on M*X transmission layers, wherein
    X is the quantity of transmission layers of the signal, wherein X is an integer that is equal to or bigger than 1.

4. The precoding matrix configuration method according to claim 1, wherein the M precoding matrices are obtained by repeating a precoding matrix group, the first configuration information is used to configure one or more offsets, a first precoding matrix in the precoding matrix group, and a quantity of repetitions of the precoding matrix group, and each of the one or more offsets is an offset of a number of a precoding matrix in the precoding matrix group relative to a number of another precoding matrix in the precoding matrix group.

5. The precoding matrix configuration method according to claim 1, wherein the method further comprises:
    receiving second configuration information, wherein the second configuration information is used to configure a pattern of precoding matrices corresponding to the N time domain units, and the pattern is designed based on M; and
    determining, based on the pattern configured by using the second configuration information and the M precoding matrices, the M precoding matrices corresponding to the N time domain units.

6. The precoding matrix configuration method according to claim 1, wherein the method further comprises:
    receiving third configuration information, wherein the third configuration information is used to configure a combined value L; and
    using N precoding matrices at a second preset position in a target sequence as precoding matrices corresponding to the N time domain units, wherein the target sequence is constructed based on a sequence obtained by repeating each of the M precoding matrices for L times in sequence.

7. A precoding matrix configuration apparatus, applied to uplink transmission, the apparatus comprising:
    at least one processor, wherein the at least one processor is configured to read instructions from a memory and execute the instructions to perform operations, the operations comprising:
    causing a transceiver to receive first configuration information from a network device, wherein the first configuration information is used to configure M precoding matrices, wherein M is an integer that is equal to or bigger than 2; and
    wherein:
        in response to the uplink transmission is non-codebook-based uplink transmission, the first configuration information comprises first indication information, wherein the first indication information indicates M sounding reference signal resource indicators (SRIs), and wherein the M SRIs are used to configure the M precoding matrices;

in response to the uplink transmission is codebook-based uplink transmission, wherein the first configuration information comprises second indication information, wherein the second indication information indicates M transmit precoding matrix indicators (TPMIs), and wherein the M TPMIs are used to configure the M precoding matrices;

aggregately sending a same signal in each of N time domain units based on the first configuration information, wherein a precoding matrix of the M precoding matrices corresponds to a time domain unit of the N time domain units, and wherein, for each of the N aggregated time domain units, the same signal is precoded by using a precoding matrix corresponding to a time domain unit, wherein the precoding matrix corresponding to the time domain unit is one of the M precoding matrices.

8. The precoding matrix configuration apparatus according to claim 7, wherein the first configuration information is downlink control information (DCI); and each of the M TPMIs is used to configure one precoding matrix with X columns; wherein X is a quantity of transmission layers of the signal, and wherein X is an integer that is equal to or greater than 1.

9. The precoding matrix configuration apparatus according to claim 8, wherein the DCI further comprises third indication information, and the third indication information indicates a number of a demodulation reference signal (DMRS) port used to send the signal; and the number, of the DMRS port, indicated by the third indication information is X numbers, of DMRS ports, that are corresponding to the third indication information and that are determined in antenna port information that is based on X transmission layers; or the number, of the DMRS port, indicated by the third indication information is X numbers, of DMRS ports, at a first preset position in a DMRS port number set, wherein the DMRS port number set is a DMRS port number set that is corresponding to the third indication information and that is determined in antenna port information that is based on M*X transmission layers, wherein X is the quantity of transmission layers of the signal, wherein X is an integer that is equal to or bigger than 1.

10. The precoding matrix configuration apparatus according to claim 7, wherein the M precoding matrices are obtained by repeating a precoding matrix group, the first configuration information is used to configure one or more offsets, a first precoding matrix in the precoding matrix group, and a quantity of repetitions of the precoding matrix group, and each of the one or more offsets is an offset of a number of a precoding matrix in the precoding matrix group relative to a number of another precoding matrix in the precoding matrix group.

11. The precoding matrix configuration apparatus according to claim 7, wherein the operations further comprise:

causing the transceiver to receive second configuration information, wherein the second configuration information is used to configure a pattern of precoding matrices corresponding to the N time domain units, and the pattern is designed based on M; and determining, based on the pattern configured by using the second configuration information and the M precoding matrices, the M precoding matrices corresponding to the N time domain units.

12. The precoding matrix configuration apparatus according to claim 7, wherein the operations further comprise:

causing the transceiver to receive third configuration information, wherein the third configuration information is used to configure a combined value L; and using N precoding matrices at a second preset position in a target sequence as precoding matrices corresponding to the N time domain units, wherein the target sequence is constructed based on a sequence obtained by repeating each of the M precoding matrices for L times in sequence.

13. The precoding matrix configuration apparatus according to claim 7, wherein the apparatus is a terminal device, a chip or a chip system.

14. A non-transitory computer-readable storage medium having instructions stored therein, which when executed by at least one processor, cause the at least one processor to perform operations, the operations comprising:

receiving first configuration information from a network device, wherein the first configuration information is used to configure M precoding matrices, wherein M is an integer that is equal to or bigger than 2; and wherein:

in response to an uplink transmission is non-codebook-based uplink transmission, the first configuration information comprises first indication information, wherein the first indication information indicates M sounding reference signal resource indicators (SRIs), and wherein the M SRIs are used to configure the M precoding matrices;

in response to the uplink transmission is codebook-based uplink transmission, wherein the first configuration information comprises second indication information, wherein the second indication information indicates M transmit precoding matrix indicators (TPMIs), and wherein the M TPMIs are used to configure the M precoding matrices;

aggregately sending a same signal in each of N time domain units based on the first configuration information, wherein a precoding matrix of the M precoding matrices corresponds to a time domain unit of the N time domain units, and wherein, for each of the N aggregated time domain units, the same signal is precoded by using a precoding matrix corresponding to a time domain unit, wherein the precoding matrix corresponding to the time domain unit is one of the M precoding matrices.

15. The non-transitory computer-readable storage medium according to claim 14, wherein the first configuration information is downlink control information (DCI); and each of the M TPMIs is used to configure one precoding matrix with X columns; wherein X is a quantity of transmission layers of the signal, and wherein X is an integer that is equal to or greater than 1.

16. The non-transitory computer-readable storage medium according to claim 15, wherein the DCI further comprises third indication information, and the third indication information indicates a number of a demodulation reference signal (DMRS) port used to send the signal; and the number, of the DMRS port, indicated by the third indication information is X numbers, of DMRS ports, that are corresponding to the third indication information and that are determined in antenna port information that is based on X transmission layers; or the number, of the DMRS port, indicated by the third indication information is X numbers, of DMRS ports, at a first preset position in a DMRS port number set, wherein the DMRS port number set is a DMRS port number set that is corresponding to the third indication information and that is determined in antenna port information that is based on M*X transmission layers, wherein X is the quantity of transmission layers of the signal, wherein X is an integer that is equal to or bigger than 1.

17. The non-transitory computer-readable storage medium according to claim 14, wherein the M precoding matrices are obtained by repeating a precoding matrix group, the first configuration information is used to configure one or more offsets, a first precoding matrix in the precoding matrix group, and a quantity of repetitions of the precoding matrix group, and each of the one or more offsets is an offset of a number of a precoding matrix in the precoding matrix group relative to a number of another precoding matrix in the precoding matrix group.

18. The non-transitory computer-readable storage medium according to claim 14, wherein the operations further comprise:

causing a transceiver to receive second configuration information, wherein the second configuration information is used to configure a pattern of precoding matrices corresponding to the N time domain units, and the pattern is designed based on M; and determining, based on the pattern configured by using the second configuration information and the M precoding matrices, the M precoding matrices corresponding to the N time domain units.

19. The non-transitory computer-readable storage medium according to claim 14, wherein the operations further comprise:

causing a transceiver to receive third configuration information, wherein the third configuration information is used to configure a combined value L; and using N precoding matrices at a second preset position in a target sequence as precoding matrices corresponding to the N time domain units, wherein the target sequence is constructed based on a sequence obtained by repeating each of the M precoding matrices for L times in sequence.

* * * * *